US006995909B1

(12) United States Patent
Hayashi et al.

(10) Patent No.: US 6,995,909 B1
(45) Date of Patent: Feb. 7, 2006

(54) LENS, OPTICAL HEAD, OPTICAL INFORMATION WRITING/READING APPARATUS AND OPTICAL INFORMATION RECORDING MEDIUM WRITING/READING METHOD

(75) Inventors: Hideki Hayashi, Nara (JP); Sadao Mizuno, Ibaraki (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 144 days.

(21) Appl. No.: 10/089,998

(22) PCT Filed: Oct. 5, 2000

(86) PCT No.: PCT/JP00/06926

§ 371 (c)(1),
(2), (4) Date: Jul. 30, 2002

(87) PCT Pub. No.: WO01/26104

PCT Pub. Date: Apr. 12, 2001

(30) Foreign Application Priority Data

Oct. 6, 1999 (JP) .................................. 11-285810

(51) Int. Cl.
*G02B 5/18* (2006.01)

(52) U.S. Cl. .............. 359/569; 369/112.06; 369/112.11

(58) Field of Classification Search ................ 359/569, 359/566, 570, 719, 721, 724, 708; 369/112.03, 369/112.04, 112.05, 112.06, 112.07, 112.08, 369/112.11, 112.12, 112.13
See application file for complete search history.

(56) References Cited

U.S. PATENT DOCUMENTS

| 5,161,040 A | | 11/1992 | Yokoyama et al. ............ 359/19 |
| 5,657,305 A | | 8/1997 | Sasaki et al. ........... 369/112.19 |
| 5,808,993 A | | 9/1998 | Lee .......................... 369/53.23 |
| 5,815,293 A | * | 9/1998 | Komma et al. ................ 359/19 |
| 5,889,748 A | | 3/1999 | Shimano et al. ....... 369/112.26 |
| 5,930,214 A | | 7/1999 | Kasahara et al. .......... 369/53.2 |
| 6,052,355 A | | 4/2000 | Saito et al. ............ 369/112.28 |
| 6,118,594 A | | 9/2000 | Maruyama ................... 359/719 |

FOREIGN PATENT DOCUMENTS

| EP | 0 610 055 A | 8/1994 |
| EP | 0 818 781 A | 1/1998 |

(Continued)

OTHER PUBLICATIONS

Japanese search report for PCT/JP00/06926 dated Feb. 20, 2001.

(Continued)

*Primary Examiner*—Thong Nguyen
*Assistant Examiner*—Arnel C. Lavarias
(74) *Attorney, Agent, or Firm*—RatnerPrestia

(57) ABSTRACT

Conventional lenses for DVD/CD compatible writing/reading are liable to CD jitter deterioration due to phase shifts in a central area.

Setting a corresponding base material thickness of an intermediate area of the circumference A2 to greater than 1.2 mm which is the base material thickness of the CD, that is, converging luminous flux that has passed through the intermediate area of the circumference A2 onto a farther place than the information recording surface of the base material thickness of the CD makes it possible to reduce jitter deterioration due to phase shifts. Further, it makes possible to provide a system with higher precision and higher reliability.

9 Claims, 22 Drawing Sheets

FOREIGN PATENT DOCUMENTS

| | | |
|---|---|---|
| EP | 0 851 415 | 7/1998 |
| EP | 0 859 357 A | 8/1998 |
| EP | 0 865 037 | 9/1998 |
| EP | 0 874 359 | 10/1998 |
| EP | 0 881 634 | 12/1998 |
| EP | 0 962 921 A | 12/1999 |
| EP | 0 996 121 | 4/2000 |
| EP | 1103958 | 5/2001 |
| GB | 2310308 | 8/1997 |
| JP | 07-302437 | 11/1995 |
| JP | 09-145995 | 6/1997 |
| JP | 9-145995 | 6/1997 |
| JP | 09-184975 | 7/1997 |
| JP | 09-219035 | 8/1997 |
| JP | 10-55563 | 2/1998 |
| JP | 10-255305 | 9/1998 |
| JP | 10-269610 | 10/1998 |
| JP | 10283668 A * | 10/1998 |
| JP | 10-293937 | 11/1998 |
| JP | 11-96585 | 4/1999 |
| JP | 2000028917 A * | 1/2000 |
| JP | 2000-81566 | 3/2000 |
| JP | 2000-131604 | 5/2000 |

OTHER PUBLICATIONS

English translation of Form PCT/ISA/210.
European Search Report corresponding to application No. EP 00 96 4666 dated Dec. 4, 2002.

* cited by examiner

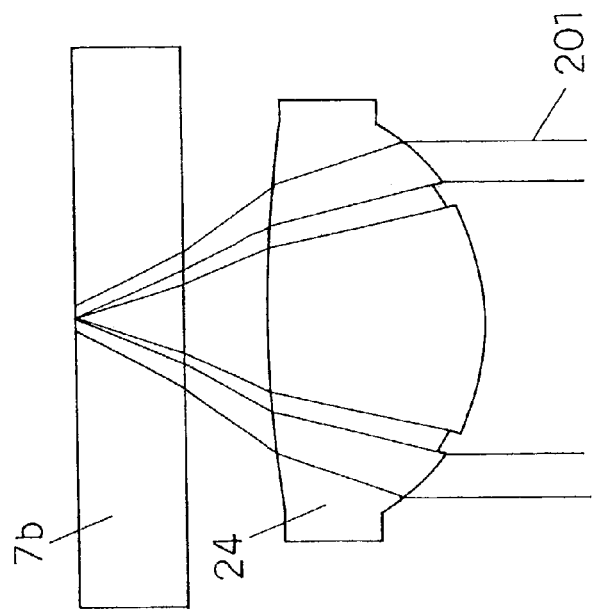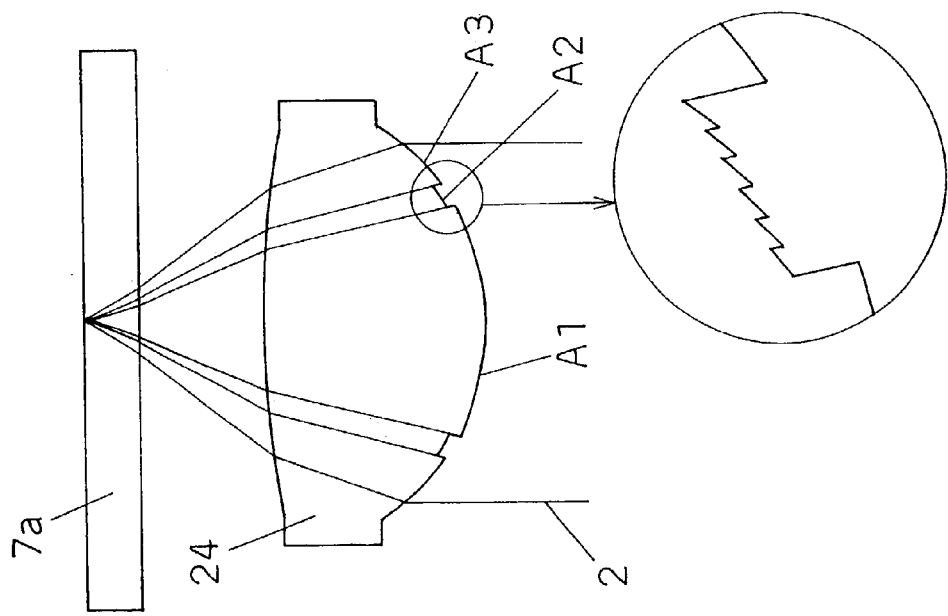

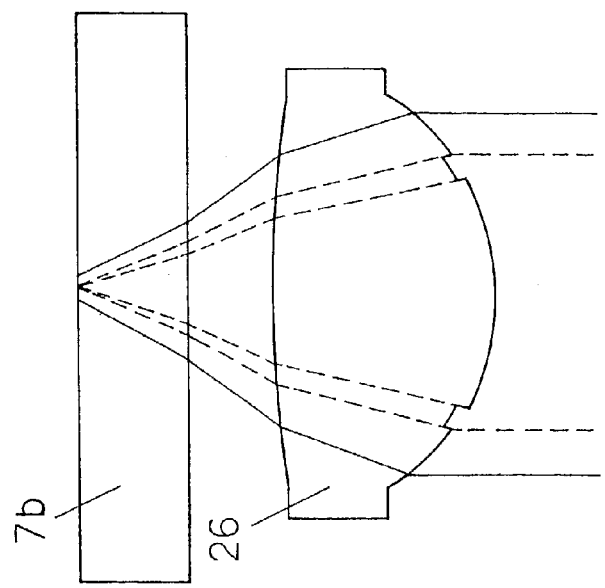
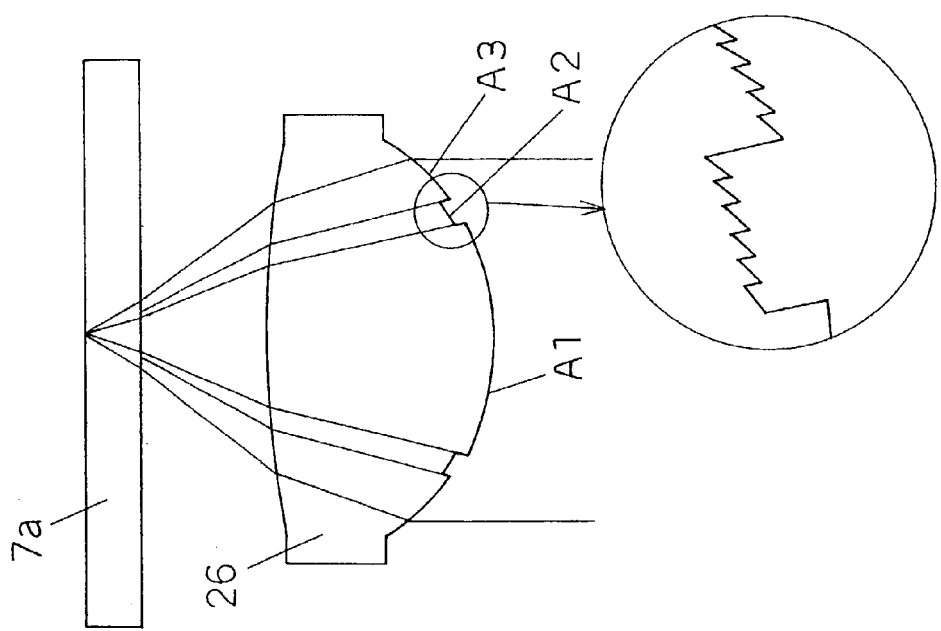
Fig. 21 (a)
Fig. 21 (b)

LENS, OPTICAL HEAD, OPTICAL INFORMATION WRITING/READING APPARATUS AND OPTICAL INFORMATION RECORDING MEDIUM WRITING/READING METHOD

THIS APPLICATION IS A U.S. NATIONAL PHASE APPLICATION OF PCT INTERNATIONAL APPLICATION PCT/JP00/06926.

TECHNICAL FIELD

The present invention relates to a lens, an optical head, an optical disk writing/reading apparatus and an optical disk writing/reading method.

BACKGROUND ART

An optical memory technology using optical disks as high density, high capacity storage media with pit-shaped patterns, is widening its applicability to digital audio disks, video disks, document file disks and data files, etc.

According to this optical memory technology, information is recorded onto and reproduced from an optical disk via micro-focused light beams with high accuracy and reliability. This writing/reading operation solely depends on its optical system.

The basic functions of the optical head, which is a major component of the optical system, are broadly grouped under convergence that forms micro spots of diffraction limits, focus control and tracking control of the above-described optical system, and detection of pit signals. These functions are provided by combining various optical systems and photoelectric transfer detection systems according to the purpose and application.

On the other hand, a high density, high capacity optical disk called "DVD" is put to practical use and stepping into a limelight as an information medium capable of handling large capacity information such as moving images in recent years. Compared to a compact disk (hereinafter, abbreviated as "CD"), which is a conventional optical disk, this DVD optical disk reduces a pit size on the information recording surface to increase recording density.

Thus, the optical head for writing/reading a DVD optical disk is different from that for a CD in a wavelength of a light source which determines a spot diameter and numerical aperture (hereinafter abbreviated as "NA") of a converging lens. By the way, while the wavelength of the light source of the CD is 0.78 $\mu$m and NA is approximately 0.45, the wavelength of the light source of the DVD optical disk is approximately 0.63 $\mu$m to 0.65 $\mu$m and NA is approximately 0.6.

Thus, writing/reading two types of optical disks, CD and DVD optical disks using a single optical disk drive requires an optical head provided with two optical systems.

On the other hand, in order to meet requirements of miniaturization, slimming and cost reduction of the optical head, the CD and DVD optical systems tend to share as many parts as possible with each other. For example, a method that two types of converging lens may be used for the DVD optical disk and for CD separately using the light source for DVD for both systems, a method that a converging lens may also be shared by making NA mechanically or optically changeable to provide greater NA for the DVD optical disk and smaller NA for the CD, or the like is adopted.

For example, as disclosed in Japanese Patent Laid-Open No. 9-219035, a method of providing compatibility between DVD and CD by optimizing a part of a converging lens which is optimized for DVD to the thickness of a CD base material in ring zone form is proposed. Of the above-described optical heads, the above-described method will be explained below with reference to the attached drawings.

FIG. 8 shows a configuration of an optical system of the optical head disclosed in Japanese Patent Laid-Open No. 9-219035. In the case of a general optical apparatus as illustrated here, an objective lens 23 is provided on an optical path between a disk 7 and optical detector 4 and a light source 1 is placed on an optical path branched from a beam splitter 5. In the optical apparatus of the above-described invention, the objective lens 23 has a characteristic shape as shown in FIGS. 9 (a) and (b).

A special part (part which is different from a normal lens and is an intermediate area separating a peripheral area which will be described later from a central area) is provided on at least one of the plane of incidence or plane of outgoing radiation of the objective lens 23. This special part is a doughnut-shaped or ring-shaped intermediate area A2 having a smaller outer diameter than the overall effective diameter of the optical path area. A central area A1 is provided inside the intermediate area A2 and a peripheral area A3 is provided outside the intermediate area A2. The curvature of the above-described central area A1 and peripheral area A3 is optimized with respect to a thin DVD (digital video disk) 7a and the curvature of the above-described central area A2 is optimized with respect to a thick CD7b (compact disk).

Then, it is desirable that the above-described optical detector 4 be designed so that the light from the peripheral area corresponding to the far-axis area does not reach when information is reproduced from a thick disk, that is, the light reaches only the central area A1 and intermediate area A2 of the objective lens. Therefore, as indicated with dotted lines in FIG. 9 (b) when the thick CD7b is written or read, the light in the central area A1 and intermediate area A2 converges to the CD7b. In this case, even if the curvature of the central area A1 corresponding to the near-axis area is optimized to the thin DVD7a, the near-axis light close to the central axis of the lens passes, which causes less spherical aberration.

Then, when the DVD7a is written or read, the light passes through the central area A1 and peripheral area A3 having the curvature optimized to the thin disk to form a focus on the information surface of the thin disk 7a.

If the numerical aperture of the areas corresponding to the central area and intermediate area of the above-described objective lens 23 is reduced to 0.4 or smaller, it is also possible to form a small spot for a thick disk and thereby form a spot of a size optimized to the CD disk.

However, when a CD optical disk is written or read, the above-described conventional configuration has a problem that jitter (a value indicating variation of the time axis) increases considerably depending on the phase position of the central area. That is, the problem is that because of lens manufacturing errors, constraints or improvement of the performance except jitter (e.g., degree of matching between the 0 level of a focus error signal and minimum jitter focus position), it is difficult to secure an appropriate jitter value when the phase position of the above-described intermediate area changes.

Furthermore, in the case of an objective lens provided with a ring zone of the conventional special section, there may be considerable level differences at the edge of the ring zone and it is difficult to perform molding using a glass press lens with high temperature stability. For this reason, molding is performed solely using a plastic lens and it is therefore necessary to create the lens and design the optical head taking into account aberration variations with temperature.

These problems will be explained with reference to the attached drawings below.

FIG. 10 (a) is a graph illustrating wavefront aberration during a CD read when NA of the objective lens 23 is 0.6 and NA inside the intermediate area A2 is 0.39 and FIG. 10 (b) is a graph illustrating a relationship between the phase difference of the intermediate area A2 with respect to the central area A1 and CD read jitter calculated using a simulation. The phase of the central area A2 is based on the phase of the central part of the objective lens 23 and the direction in which the phase of the intermediate area A2 delays from the phase of the central part is assumed to be positive.

As apparent from FIG. 10, when the thickness of the corresponding base material of the intermediate area A2 is 1.2 mm corresponding to the thickness of the CD base material, that is, when the intermediate area A2 is set so that its spherical aberration is optimal for the 1.2 mm CD, jitter may deteriorate drastically depending on the phase. That is, this indicates that, when the phase deviates from an ideal state because of manufacturing errors, etc., there is a problem that it may be difficult to secure CD read jitter.

Moreover, the objective lens with the conventional central ring zone may have considerable level differences in both of or at least one of the inside and outside perimeters of the ring zone and even if an attempt is made to perform molding using a glass lens with high temperature stability, the molding is difficult from the standpoint of volume production or even if the molding is applicable to the shape, a large transition area (area in which the shape of the section including level differences inevitably differs from the ideal shape from the standpoint of manufacturing of the molding die and could cause deterioration of a read signal, etc.), causing a problem that it is impossible to obtain sufficient characteristics.

DISCLOSURE OF THE INVENTION

In view of the problems of the conventional optical head described above and it is an object of the present invention to reduce variations of a jitter value depending on the state of the phase of the intermediate area and broaden the range of selection of the amount of phase.

It is another object of the present invention to suppress the amount of level differences produced and allow molding using a glass press lens with excellent temperature stability.

Furthermore, in the above-described conventional configuration, luminous flux that passes through the intermediate area when writing/reading a DVD optical disk does not contribute to writing or reading, causing a problem that the utilization efficiency of laser light emitted from a semiconductor laser remains low.

Moreover, spherical aberration of the inside perimeter during a CD read is not corrected, causing a problem that a detection signal deteriorates.

These problems will be explained below with reference to the attached drawings.

FIG. 9 (a) shows a case where the DVD7a is written or read using the objective lens 23. As described above, when the DVD7a is written or read, the luminous fluxes that have passed through the central area A1 and peripheral area A3 constitute the converging spot on the DVD7a, but the luminous flux that has passed through the intermediate area A2 does not converge on the DVD7a. That is, the luminous flux that passes through the intermediate area A2 is not used for writing or reading, and therefore the efficiency with respect to the quantity of light projected into the lens decreases compared to a normal DVD-only lens.

On the other hand, FIG. 9 (b) shows a case where the CD7b is read using the objective lens 23. As described above, when the CD7b is written or read, the luminous fluxes that have passed through the central area A1 and intermediate area A2 constitute the converging spot on the CD7b, but the central area A1 is optimized so as to read the DVD7a, and therefore slight spherical aberration occurs when the CD7b is written or read despite the fact that its NA is low. FIG. 19 (b) shows a focus error signal when the CD7b is read using the objective lens 23. Though it is small spherical aberration, this spherical aberration causes a pseudo-signal to occur in the focus signal. This pseudo-signal is attributable to misoperation during focusing.

In view of such problems of the optical head the object of the present invention is to improve the light utilization efficiency as the area to make the intermediate area usable to both DVD and CD. It is another object of the present invention to expand the area of the intermediate area and reduce spherical aberration during a CD read/write without sacrificing the light utilization efficiency and DVD characteristics and improve the quality of a focus error signal, etc.

One aspect of the present invention is a convex lens for allowing luminous flux from a light source to converge to a first optical information recording medium having a predetermined thickness and a second optical information recording medium thicker than the first optical information recording medium, characterized in that said convex lens comprises:

a central area close to a central axis of said luminous flux;
a peripheral area far from said central axis; and
an intermediate area located midway between said central area and said peripheral area, and
the luminous flux converging onto an information recording surface of said first optical information recording medium is the luminous flux that has passed through said central area and said peripheral area,
the luminous flux converging onto the information recording surface of said second optical information recording medium is the luminous flux that has passed through said intermediate area and said central area, and
the phase of the luminous flux that passes through said intermediate area is shifted with respect to the phase of the luminous flux that passes through said central area.

Another aspect of the present invention is the lens, characterized in that the phase of the luminous flux that passes through the innermost perimeter of said intermediate area is shifted with respect to the phase of the luminous flux that passes through the outermost perimeter of said central area.

Still another aspect of the present invention is the, characterized in that a shift of said phase is set so as to delay by an amount $\Delta$ that satisfies the following (Equation 1):

$$240°+m\times360°<\Delta<360°+n\times360° \qquad \text{Equation 1}$$

m: Integer, n: integer more than or equal to m

Yet still another aspect of the present invention is the lens, characterized in that said amount $\Delta$ is an amount that satisfies the following (Equation 2):

$$270°+m\times360°<\Delta<330°+n\times360° \qquad \text{Equation 2}$$

m: Integer, n: integer more than or equal to m

Still yet another aspect of the present invention is a convex lens for allowing luminous flux from a light source to converge to a first optical information recording medium having a predetermined thickness and a second optical information recording medium thicker than the first optical information recording medium, characterized in that said lens comprises:

a central area close to a central axis of said luminous flux;

a peripheral area far from said central axis; and an intermediate area located midway between said central area and said peripheral area, and the luminous flux converging onto the information recording surface of said first optical information recording medium is the luminous flux that has passed through said central area and said peripheral area, the luminous flux converging onto the information recording surface of said second optical information recording medium is the luminous flux that has passed through said intermediate area and said central area, and said intermediate area has nature that spherical aberration is optimized to an optical information recording medium thicker than said second optical information recording medium.

A further aspect of the present invention is a convex lens for allowing luminous flux from a light source to converge to a first optical information recording medium having a predetermined thickness and a second optical information recording medium thicker than the first optical information recording medium, characterized in that said convex lens comprises:

a central area close to a central axis of said luminous flux;

a peripheral area far from said central axis; and an intermediate area located midway between said central area and said peripheral area, and the luminous flux converging onto the information recording surface of said first optical information recording medium is the luminous flux that has passed through said central area and said peripheral area, the luminous flux converging onto the information recording surface of said second optical information recording medium is the luminous flux that has passed through said intermediate area and said central area, and the intermediate area that separates said central area from said peripheral area is formed on a surface of the lens, the surface facing said optical information recording medium.

A still further aspect of the present invention is a convex lens for allowing luminous flux from a light source to converge to a first optical information recording medium having a predetermined thickness and a second optical information recording medium thicker than the first optical information recording medium, characterized in that said lens comprises:

a central area close to a central axis of said luminous flux;

a peripheral area far from said central axis; and an intermediate area located midway between said central area and said peripheral area, and the luminous flux converging onto the information recording surface of said first optical information recording medium is the luminous flux that has passed through said central area and said peripheral area, the luminous flux converging onto the information recording surface of said second optical information recording medium is the luminous flux that has passed through said intermediate area and said central area, and said central area is designed so that the phase of luminous flux that has passed through the area thereof is substantially shifted with respect to the phase of the luminous flux that has passed through said peripheral area.

A yet further aspect of the present invention is the lens, characterized in that said phase shift substantially corresponds to one wavelength.

A still yet further aspect of the present invention is the lens, characterized in that when the numerical aperture (hereinafter referred to as "NA") of all luminous fluxes that have passed through said lens is assumed to be (a), said NA of the boundary between said central area and said intermediate area is 0.6(a) to 0.8(a) and said NA of the boundary between said intermediate area and said peripheral area is 0.7(a) to 0.9(a).

An additional aspect of the present invention is the lens, characterized in that the thickness of said first optical information recording medium is substantially 0.6 mm and the thickness of said second optical information recording medium is substantially 1.2 mm, and said intermediate area has nature that spherical aberration is optimized with respect to an optical information recording medium with a base material thickness within the following range:

$$1.2 \text{ mm} < \text{base material thickness} \leq 1.8 \text{ mm}$$

A still additional aspect of the present invention is an optical head, characterized by comprising the lens and a photoreception element that receives reflected light from said first optical information recording medium or said second optical information recording medium and converts said reflected light to an electric signal.

A yet additional aspect of the present invention is an optical information recording medium writing/reading apparatus, characterized by comprising said optical head and a circuit that distinguishes said first optical information recording medium from said second optical information recording medium, selectively reads information from said electric signal, wherein the apparatus, converges luminous flux from a light source onto said first optical information recording medium or said second optical information recording medium, receives reflected light from said first optical information recording medium or said second optical information recording medium, converts said reflected light to an electric signal and reads information from said electric signal, converges the luminous flux that has passed through said central area and said peripheral area of said lens onto the information recording surface of said first optical information recording medium, and converges the luminous flux that has passed through said intermediate area and said central area of said lens onto the information recording surface of said second optical information recording medium.

A still yet additional aspect of the present invention is an optical information recording medium writing/reading method for, by using the optical head and a circuit that distinguishes said first optical information recording medium from said second optical information recording medium and selectively reads information from said electric signal, converging luminous flux from a light source onto said first optical information recording medium or said second optical information recording medium, receiving reflected light from said first optical information recording medium or said second optical information recording medium, converting said reflected light to an electric signal and reading information from said electric signal, characterized in that the luminous flux that has passed through said central area and said peripheral area of said lens is allowed to converge onto the information recording surface of said first optical information recording medium, and the luminous flux that has passed through said intermediate area and said central area of said lens is allowed to converge onto the information recording surface of said second optical information recording medium.

A supplementary aspect of the present invention is a convex lens for allowing luminous flux from a first light source to converge to a first optical information recording medium having a predetermined thickness and allowing luminous flux from a second light source having a wavelength different from the first light source to converge to a second optical information recording medium which is thicker than the first optical information recording medium, characterized in that said lens comprises:

a central area close to the central axis of said luminous flux;

a peripheral area far from said central axis; and an intermediate area located midway between said central area and said peripheral area, and the luminous flux converging onto the information recording surface of said first optical information recording medium from said first light source is the luminous flux that has passed through said central area, said intermediate area and said peripheral area, the luminous flux converging onto the information recording surface of said second optical information recording medium from said second light source is the luminous flux that has passed through said intermediate area and said central area, and said intermediate area is provided with a diffraction grating.

A still supplementary aspect of the present invention is the lens, characterized in that the diffraction grating of the intermediate area, using diffracted light of the same order, forms luminous flux from the first light source into good wavefront with respect to the first optical information recording medium and forms luminous flux from the second light source into good wavefront with respect to the second optical information recording medium.

A yet supplementary aspect of the present invention is the lens, characterized in that of the luminous flux converged onto the information recording surface of said second optical information recording medium from said second light source, the phase of the luminous flux that passes through said intermediate area is shifted with respect to the phase of the luminous flux that passes through said central area.

A still yet supplementary aspect of the present invention is the lens, characterized in that the shift of said phase is set so as to delay by an amount Δ that satisfies the following (Equation 1):

$$240°+m\times360°<\Delta<360°+n\times360°$$ Equation 1 m: Integer, n: integer more than or equal to m

Another aspect of the present invention is the lens, characterized in that said amount Δ is an amount that satisfies the following (Equation 2):

$$270°+m\times360°<\Delta<330°+n\times360°$$ Equation 2 m: Integer, n: integer more than or equal to m

Still another aspect of the present invention is the lens, characterized in that wherein a diffraction grating is provided in the peripheral area far from said central axis.

Yet still another aspect of the present invention is an optical head, characterized by comprising:

a lens according to any one of the 14th to 19th inventions; and a photoreception element that receives reflected light from said first optical information recording medium or said second optical information recording medium and converts said reflected light to an electric signal.

Still yet another aspect of the present invention is an optical information recording medium writing/reading apparatus, characterized by comprising said optical head and a circuit that distinguishes said first optical information recording medium from said second optical information recording medium and selectively reads information from said electric signal, wherein the apparatus, converges luminous flux from a light source onto said first optical information recording medium or said second optical information recording medium, receives reflected light from said first optical information recording medium or said second optical information recording medium, converts said reflected light to an electric signal and reads information from said electric signal, converges the luminous flux that has passed through said central area and said peripheral area of said lens onto the information recording surface of said first optical information recording medium, and converges the luminous flux that has passed through said intermediate area and said central area of said lens onto the information recording surface of said second optical information recording medium.

A further aspect of the present invention is an optical information recording medium writing/reading method for, by using an optical head and a circuit that distinguishes said first optical information recording medium from said second optical information recording medium and selectively reads information from said electric signal, converging luminous flux from a light source onto said first optical information recording medium or said second optical information recording medium, receiving reflected light from said first optical information recording medium or said second optical information recording medium, converting said reflected light to an electric signal and reading information from said electric signal, wherein the luminous flux that has passed through said central area and said peripheral area of said lens is allowed to converge onto the information recording surface of said first optical information recording medium, and the luminous flux that has passed through said intermediate area and said central area of said lens is allowed to converge onto the information recording surface of said second optical information recording medium.

BRIEF DESCRIPTION OF THE DRAWINGS

FIGS. 15 (a) and (b) illustrate an objective lens of the embodiment above;

FIGS. 21 (a) and (b) illustrate an objective lens of the embodiment above; and

DESCRIPTION OF SYMBOLS

Figure 1:
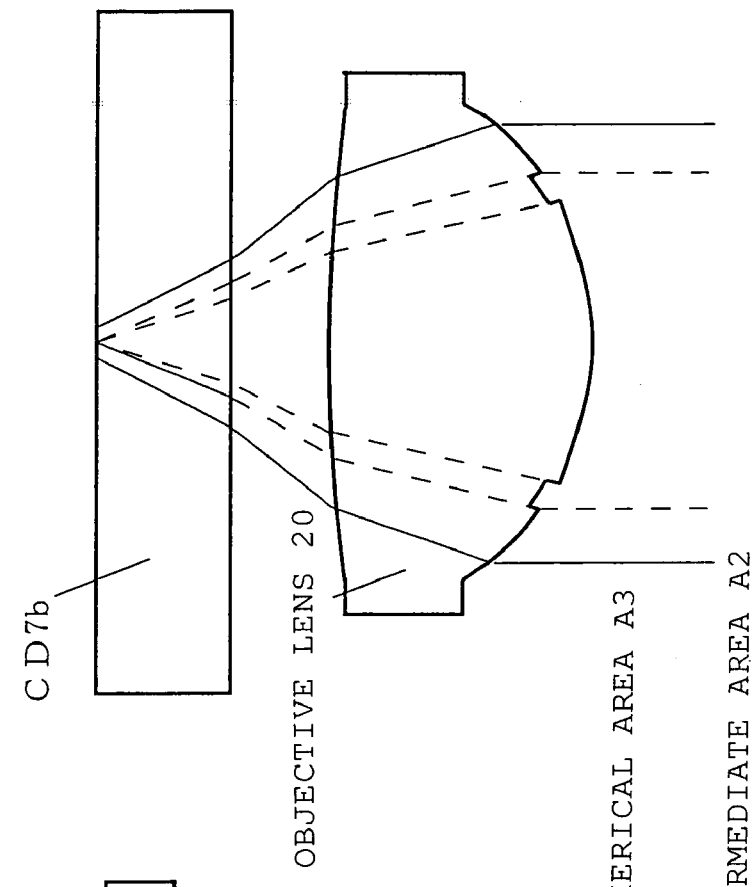
FIGS. 1 (*a*) and (*b*) illustrate an objective lens according to Embodiment 1 of the present invention.
Figure 1:
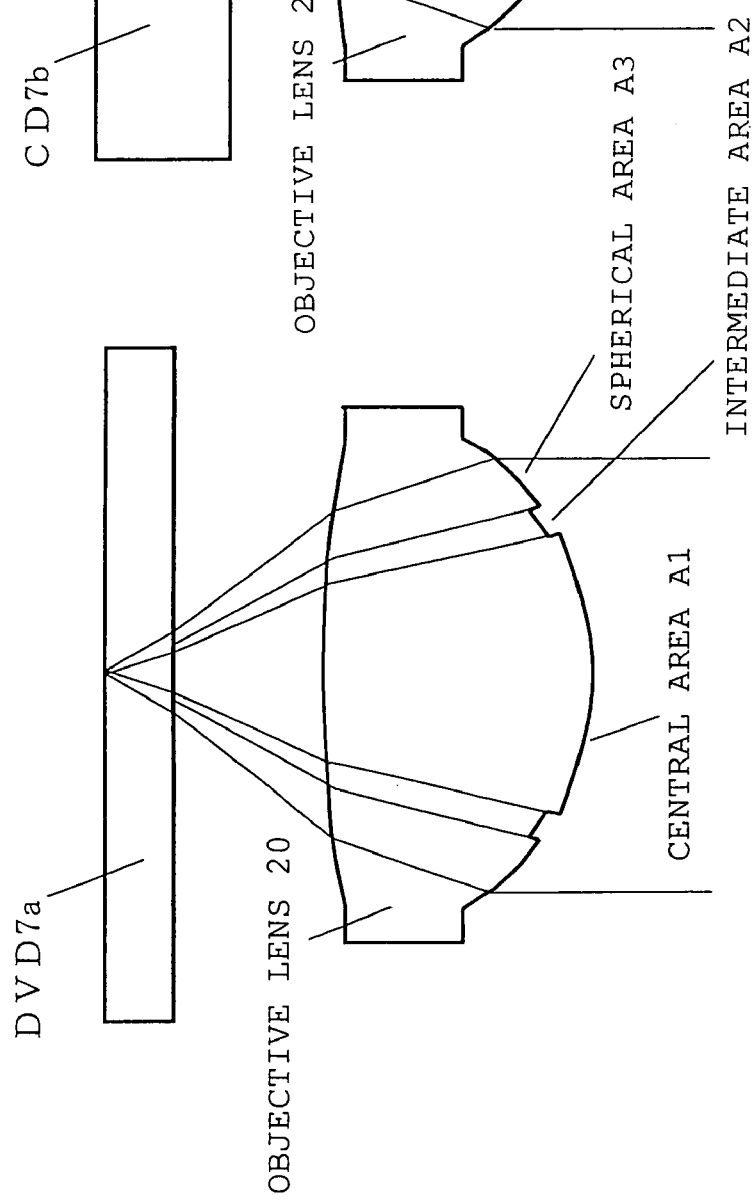

1 Semiconductor laser
2 Optical beam
3 Collimator lens
4 Photo detector
5 Beam splitter
7a Optical disk (DVD)
7b Optical disk (CD)
20 Objective lens according to Embodiment 1 of the present invention
21 Objective lens according to Embodiment 2 of the present invention
22 Objective lens according to Embodiment 3 of the present invention
23 Objective lens of conventional optical head

BEST MODE FOR CARRYING OUT THE INVENTION

With reference to the attached drawings, embodiments the present invention will be explained below.

Embodiment 1

Figure 8:
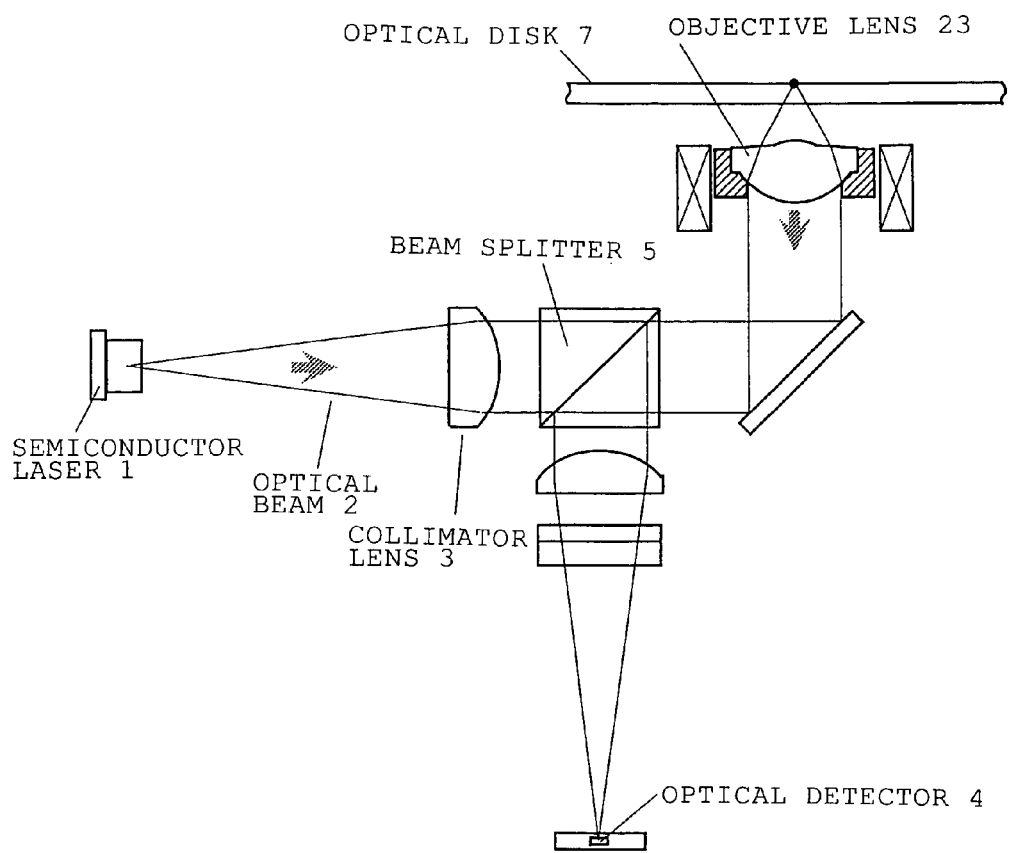
FIG. 8 illustrates a configuration of an optical system of a conventional optical head.
Figure 9:
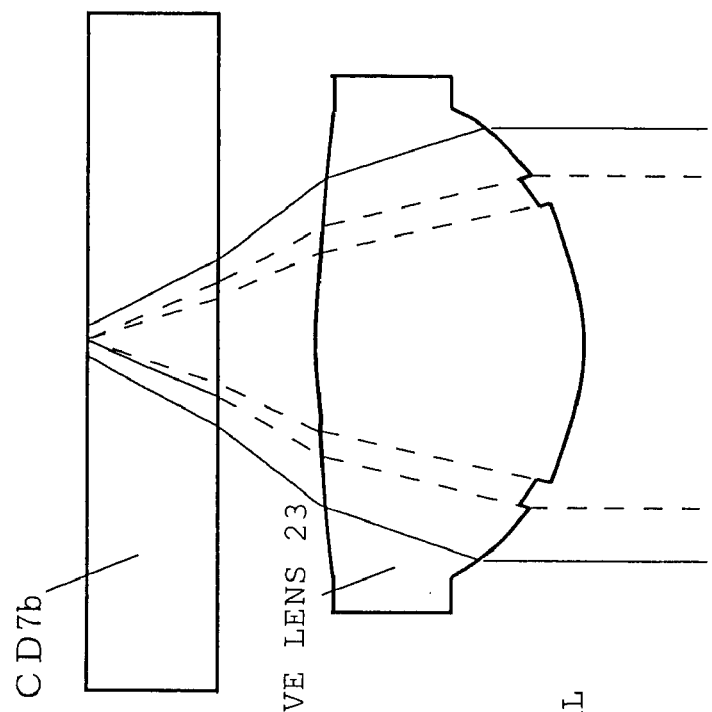
FIG. 9 illustrates an objective lens of the conventional optical head.
Figure 9:
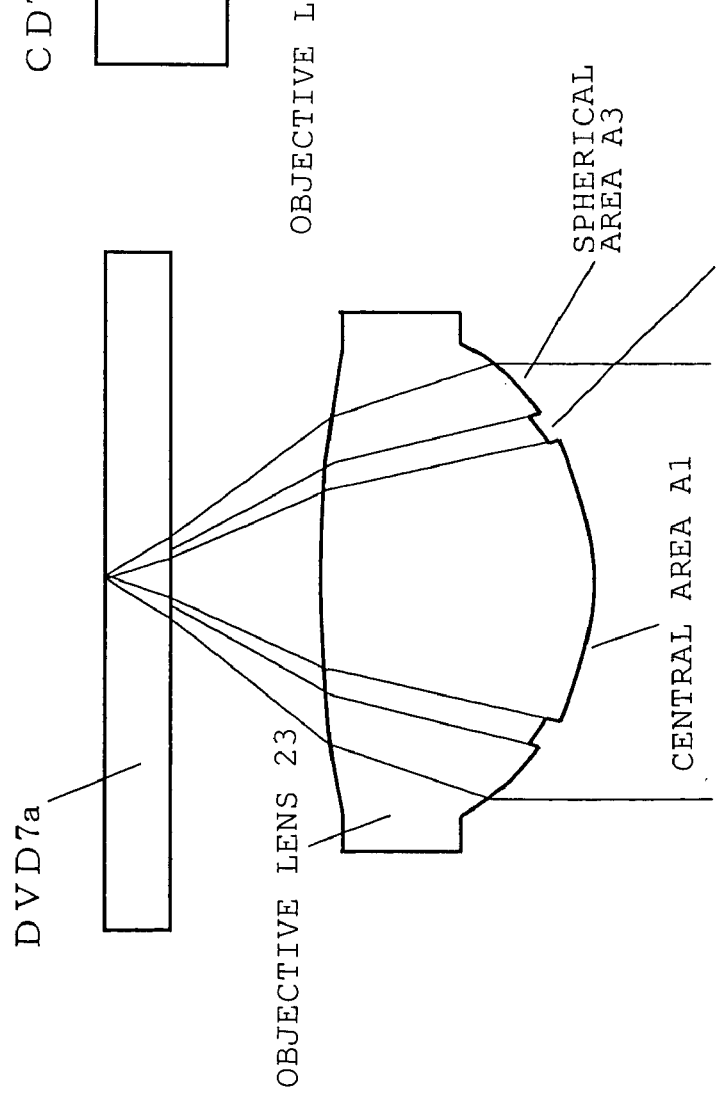
Figure 10:
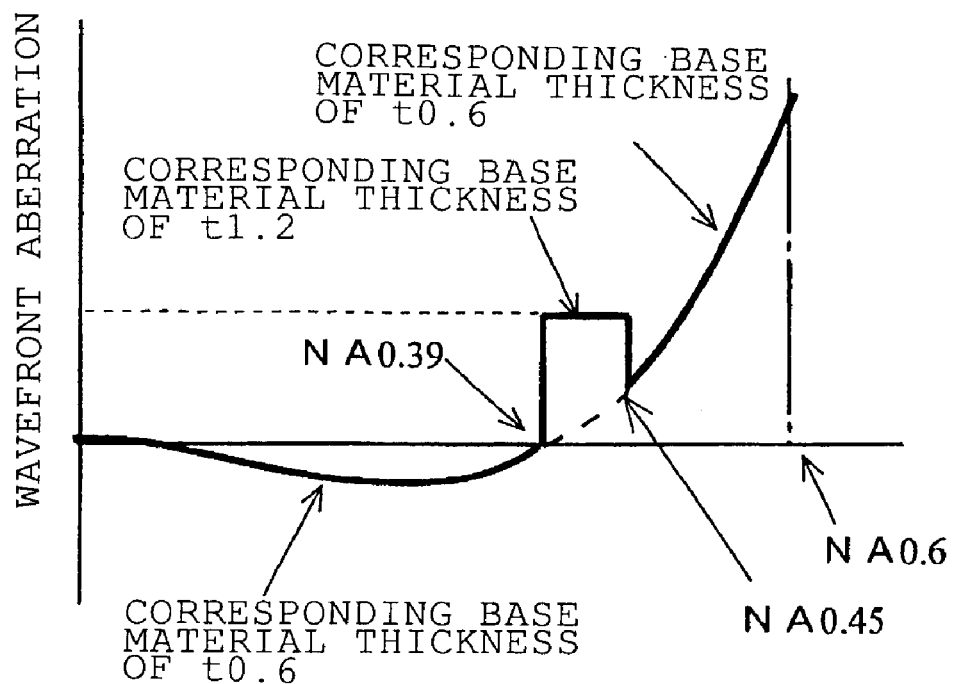
FIG. 10 illustrates the thickness of a corresponding base material of the intermediate area and a phase relationship between the intermediate area and central area of the conventional example.
Figure 11:
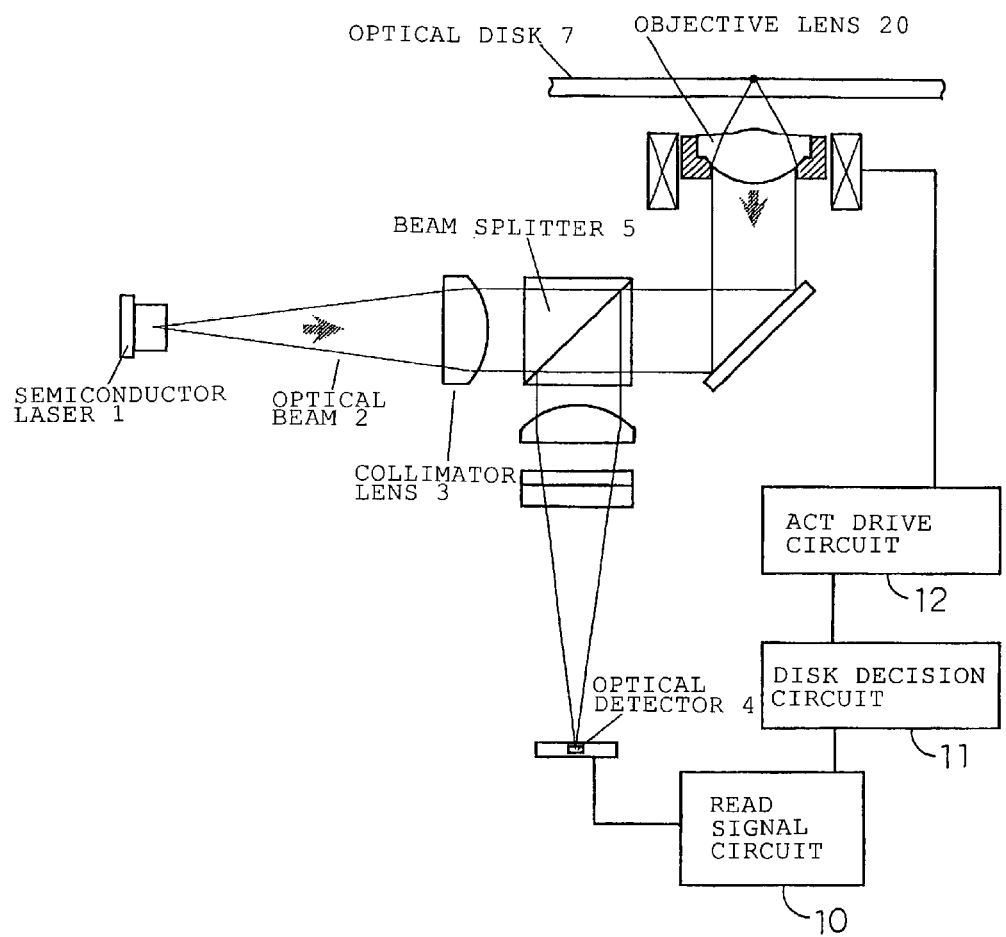
FIG. 11 illustrates a configuration of an optical system of an optical head according to Embodiment 1 of the present invention.

FIG. 11 illustrates a configuration of an optical system of an optical head according to Embodiment 1 of the present invention. The configuration shown in the same drawing is the same as the configuration of the optical head of the conventional example shown in FIG. 8 except the objective lens 20 and the same components as those in FIG. 8 are assigned the same reference numerals and explanations thereof will be omitted. A photo detector 4 in FIG. 11 is applicable as the photoreception element of the optical head of the present invention and a read signal circuit 10 in FIG. 11 is applicable as the circuit of the optical information writing/reading apparatus of the present invention. The photo detector 4 is the means of receiving reflected light from the optical disk 7 and converting the reflected light to an electric signal and the read signal circuit 10 is a circuit that distinguishes the type of the optical disk 7 and selectively reads information from the electric signal.

What the objective lens 20 according to Embodiment 1 shown in FIG. 1 differs from the objective lens 23 shown in the convention example is the thickness of the corresponding base material of the intermediate area A2. In the conventional example, the thickness of the corresponding base material of the intermediate area A2 is optimized to a thick disk, that is, a CD with a base material thickness of 1.2 mm in this case, while in the present invention, it is optimized to a base material thicker than the CD, that is, 1.6 mm. That is, spherical aberration is optimized for a CD with a base material thickness of 1.6 mm.

Figure 2:
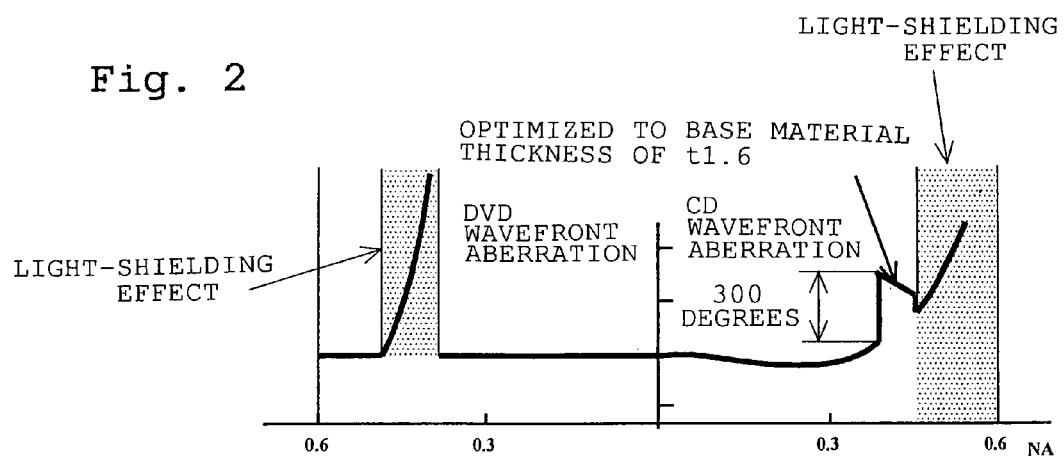
FIG. 2 illustrates a wavefront on a disk during reading of DVD or CD according to the above embodiment.

FIG. 2 shows wavefront aberration when the DVD7a with a base material thickness of 0.6 mm and CD7b with a base material thickness of 1.2 mm are read. The section of the intermediate area A2 is optimized to the base material thickness of 1.6 mm as shown above, and therefore aberration is provided also when the CD7b with a base material thickness of 1.2 mm is read.

Figure 3:
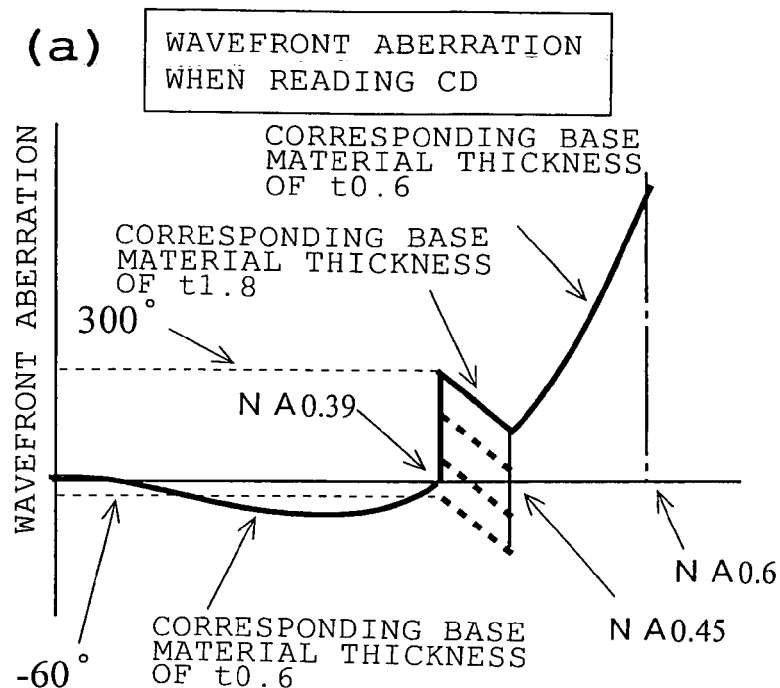
FIGS. 3 (a) and (b) illustrate a thickness of a base material corresponding to an intermediate area, a phase relationship between the intermediate area and central area and a relationship of a CD read signal with jitter.
Figure 3:
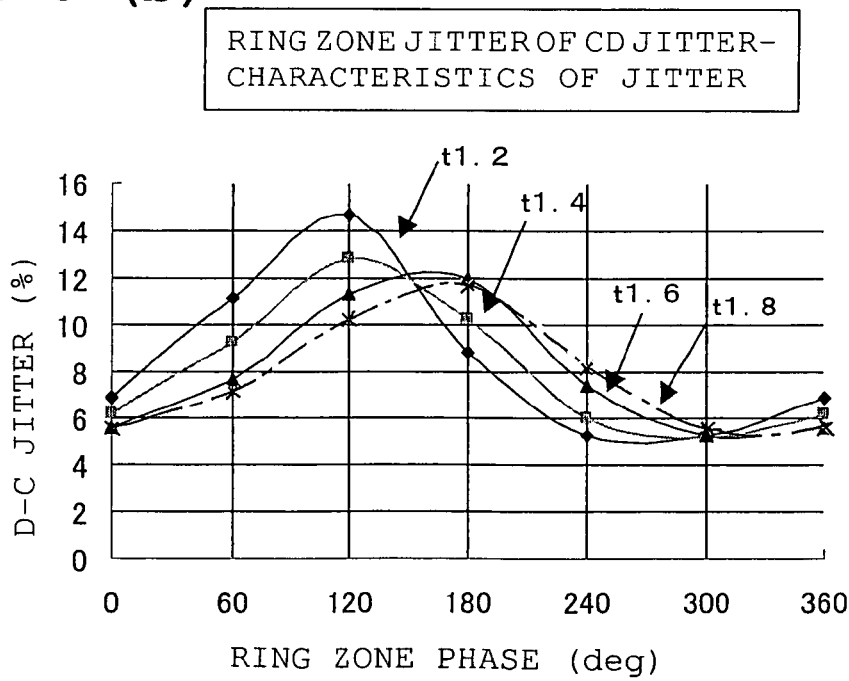

On the other hand, FIG. 3(a) shows wavefront aberration during a CD read. FIG. 3(b) shows the phase shift of the part of the intermediate area that contacts the central area A1 with respect to the central part of the lens and the variation of CD read jitter when the corresponding base material thickness of the intermediate area A2 is changed from 1.2 mm to 1.8 mm.

From this, (1) it is observed that it is possible to reduce jitter variations due to phase jitter of the intermediate area A2 by changing the corresponding base material thickness of the central area A2 from 1.2 mm to 1.6 mm and according to this simulation result, (2) when the corresponding base material thickness of the central area A2 is 1.6 mm, it is also observed that when the amount of phase is delayed by 300 degrees, that is advanced by 60 degrees, CD read jitter can be reduced most.

Thus, after setting the corresponding base material thickness of the central area A2 to 1.6 mm, it is desirable to adjust the setting so that the phase of luminous flux advances by 300 degrees (−60 degrees) with respect to the central part of the lens of the objective lens 20.

Thus, instead of setting the corresponding base material thickness of the central area A2 to 1.2 mm as in the case of the conventional example, setting the corresponding base material thickness of the central area A2 to 1.6 mm and shifting the phase difference shown in this embodiment makes it possible to reduce deterioration of jitter due to phase shifts associated with manufacturing errors, etc.

In short, it is desirable that the above-described phase shift be set so as to delay by amount Δ that satisfies the following (Equation 1).

$$240°+m\times360°<\Delta<360°+n\times360°$$ Equation 1 m: Integer, n: integer more than or equal to m

Furthermore, it is further desirable that the above-described amount Δ be an amount that meets the following (Equation 2).

$$270°+m\times360°<\Delta<330°+n\times360°$$ Equation 2 m: Integer, n: integer more than or equal to m

On the other hand, it is also desirable that the intermediate area have the nature that spherical aberration is optimized with respect to the optical information recording medium of a base material thickness within the following range:

1.2 mm<base material thickness≦1.8 mm

Embodiment 2

Figure 4:
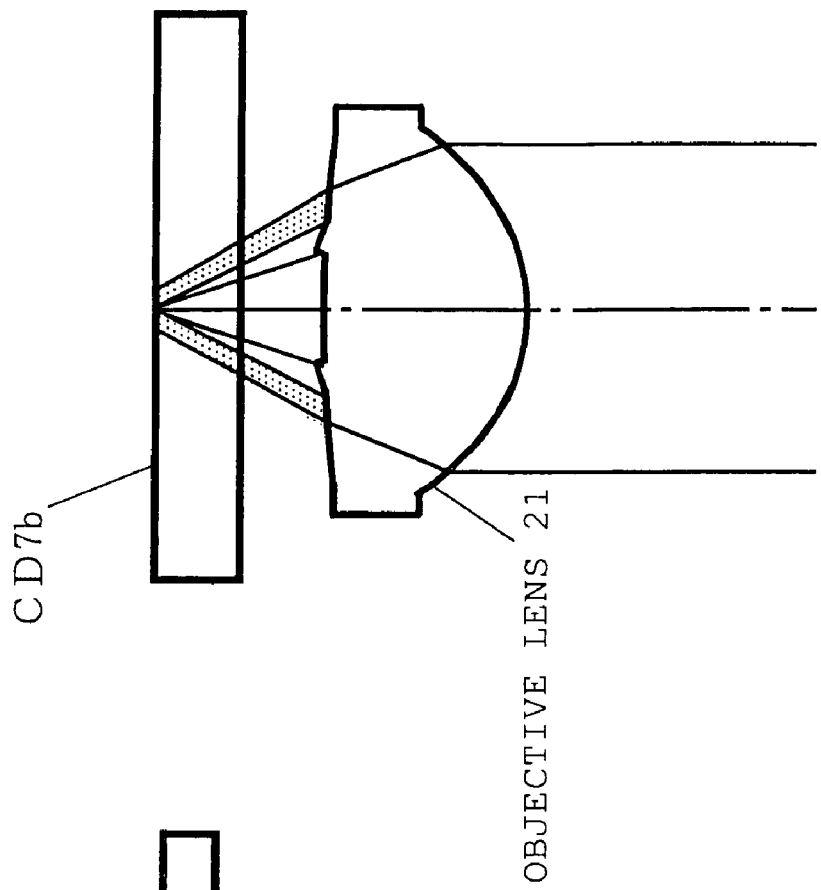
FIGS. 4 (a) and (b) illustrate an objective lens according to Embodiment 2 of the present invention.
Figure 4:
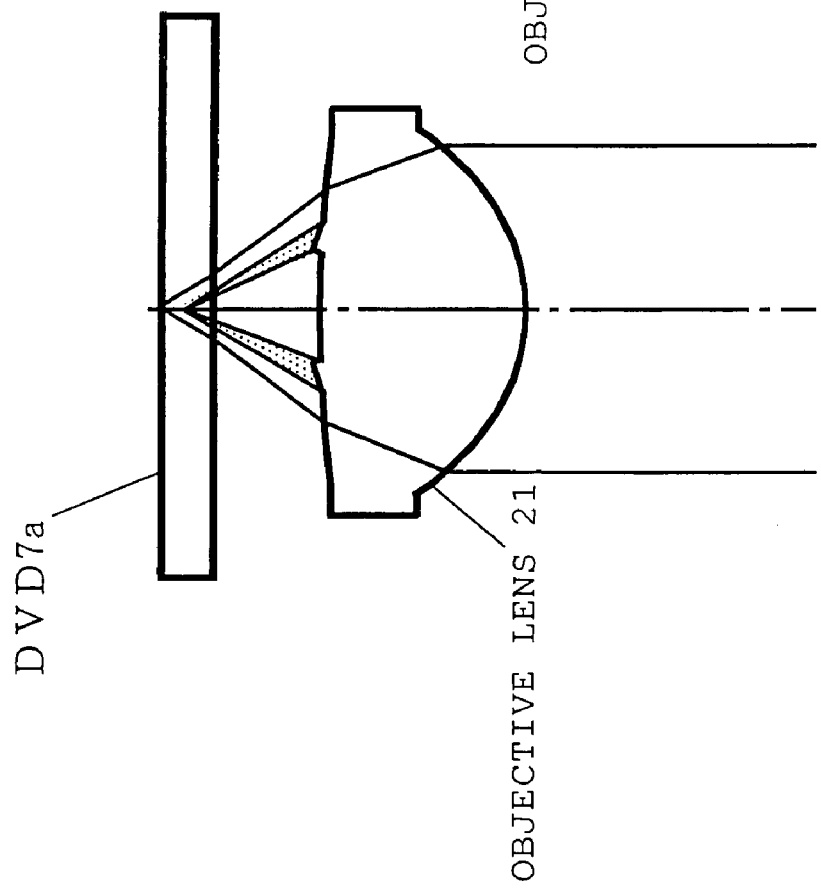
Figure 12:
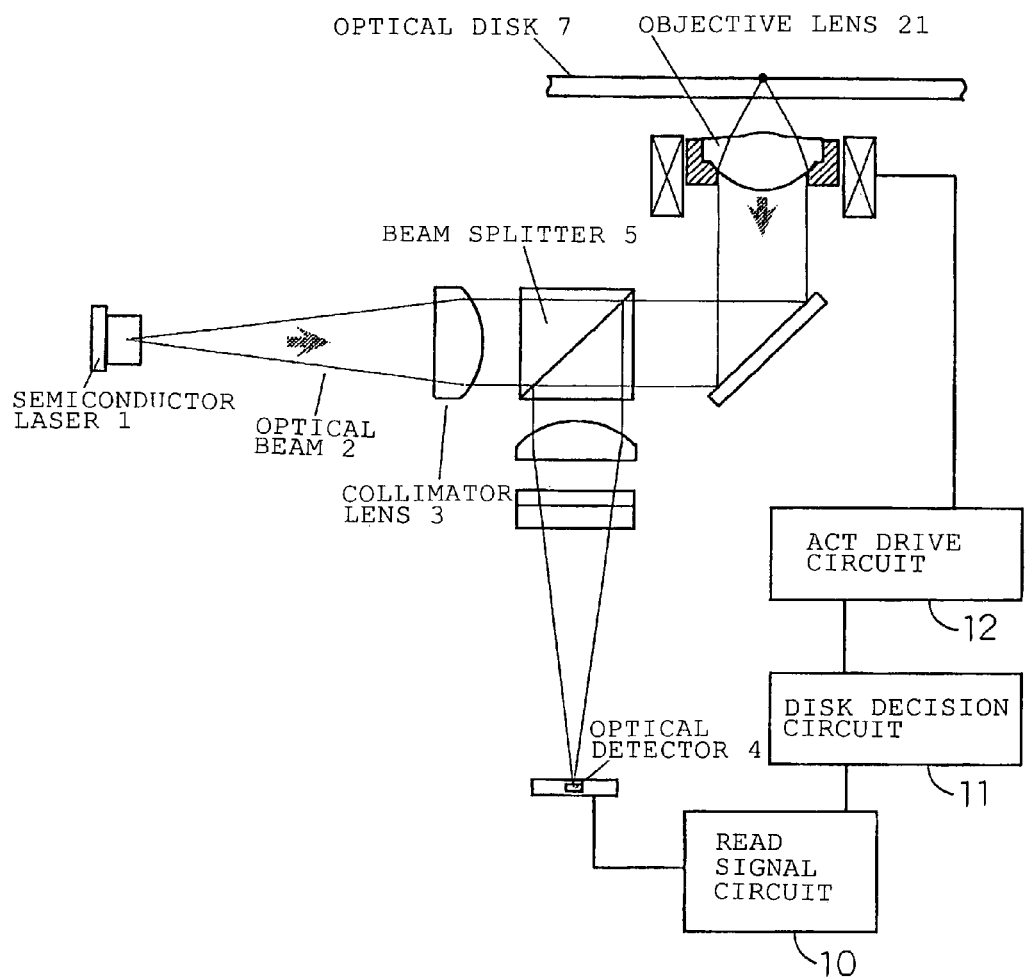
FIG. 12 illustrates a configuration of an optical system of an optical head according to Embodiment 2 of the present invention.

FIG. 12 illustrates a configuration of an optical system of an optical head according to Embodiment 2 of the present invention. The configuration shown in the same drawing is the same as the configuration of the optical head shown in Embodiment 1 of the present invention except the objective lens 21 and the same components as those in FIG. 11 are assigned the same reference numerals and explanations thereof will be omitted. FIG. 4 shows the objective lens 21 according to Embodiment 2.

As shown in FIG. 4, what the objective lens 21 according to Embodiment 2 differs from the objective lens 20 shown in Embodiment 1 is that the surface on which the intermediate area A2 is set is a second surface which is the surface of the side facing the substrate and the thickness of the corresponding base material of the intermediate area A2.

In Embodiment 1, the intermediate area A2 is set on the side of the first surface, while in this Embodiment, setting the intermediate area A2 on the side of the second surface with smaller curvature makes it possible to reduce the transition area necessary to perform glass press molding (area in which the shape of the area including level differences inevitably differs from an ideal shape for reasons related to manufacturing of molding dies and could cause deterioration of a read signal, etc.).

Furthermore, the corresponding base material thickness of the intermediate area A2 is optimized to a thick disk, that is, 1.6 mm in Embodiment 1, while in this Embodiment 2, the corresponding base material thickness of the intermediate area A2 is optimized to an even thicker base material of 1.8 mm and there is no level difference between the intermediate area A2 and peripheral area A3.

Figure 5:
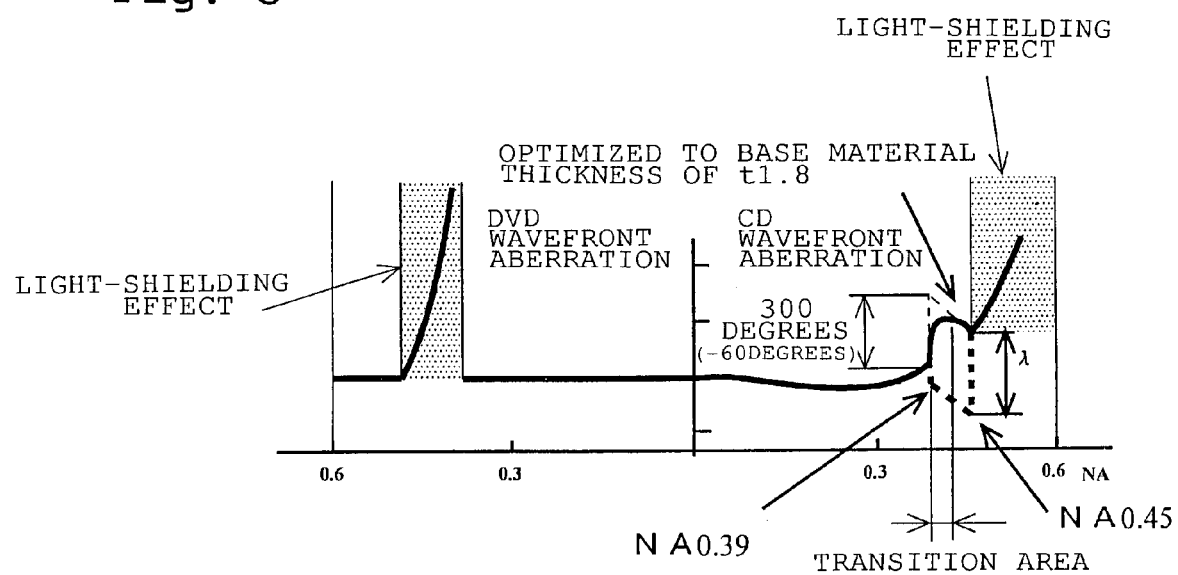
FIG. 5 illustrates a wavefront on the disk during reading of the DVD or CD according to the above embodiment.

FIG. 5 illustrates wavefront aberration when a DVD7*a* with a base material thickness of 0.6 mm and CD7*b* with a base material thickness of 1.2 mm are read using the objective lens 21 according to Embodiment 2.

A general method of molding an objective lens is to perform injection molding on a plastic material or apply thermo-pressing to a plastic material or glass material. Since processing is performed using metal molds in all cases, the ease of processing of metal molds and the life of metal molds are important factors that affect the cost of the lens itself.

From the standpoint of processing of metal molds, level differences on a lens need to be processed using sharp cutting tools, and are therefore not desirable. Therefore, it is desirable that either the inside perimeter or the outside perimeter of the intermediate area A2 be contiguous on the boundary to the central area A1 or peripheral area A3 without level differences.

Furthermore, when the shape of the cutting tool is taken into account, even if the central area A1 and intermediate area A2 are contiguous, the bending angle of the metal mold surface is 180 degrees or less, which inevitably requires processing with a sharp cutting tool. For this reason, it is further desirable that the contiguous plane be outside the intermediate area A2, that is, that the boundary with the peripheral area A3 be contiguous.

According to the design by the inventor, it has been found that by setting the corresponding base material thickness of the intermediate area A2 to 1.8 mm, NA of the outside of the intermediate area A2 to 0.45 and NA of the inside to 0.39, it is possible to eliminate level differences between the central area A2 and peripheral area A3 and change the phase in the center of the lens to close to ideal 300 degrees because of jitter reduction during a CD read.

Such design requires a transition area to be provided on the boundary between the intermediate area A2 and central area A1, but it is a level that will not affect the quality of a read signal and it is now possible to manufacture metal molds capable of molding glass materials.

Using this Embodiment 2 makes it possible to apply a press working method for glass materials and construct a high precision, high reliability system required for a DVD system in particular.

Embodiment 3

Figure 6:
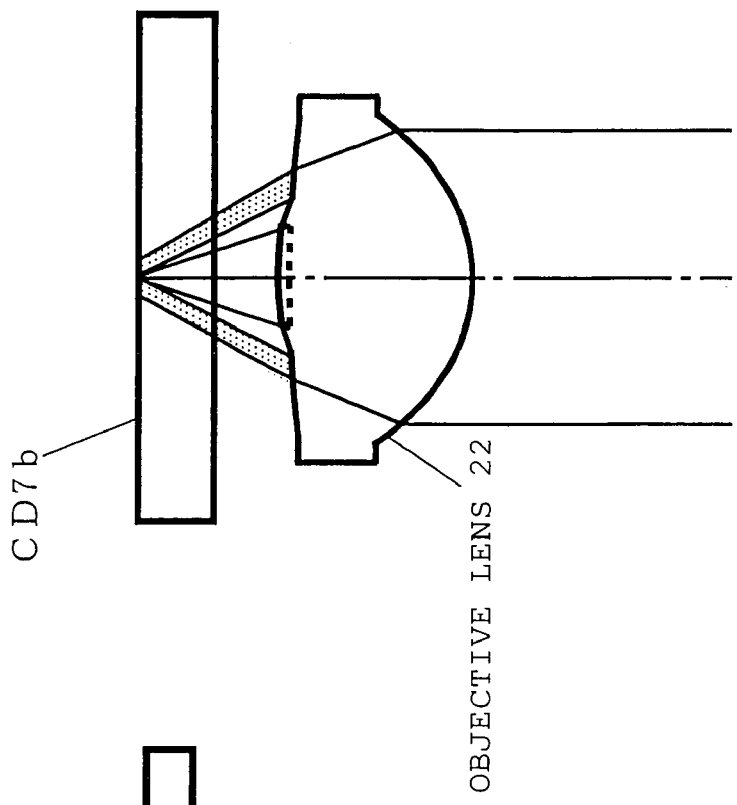
FIGS. 6 (a) and (b) illustrate an objective lens according to Embodiment 3 of the present invention.
Figure 6:
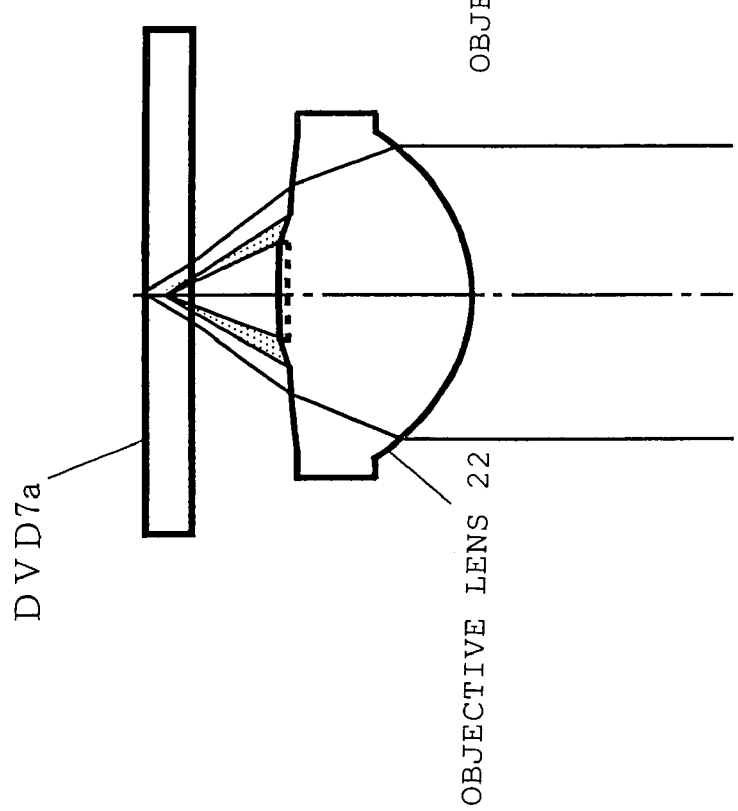
Figure 13:
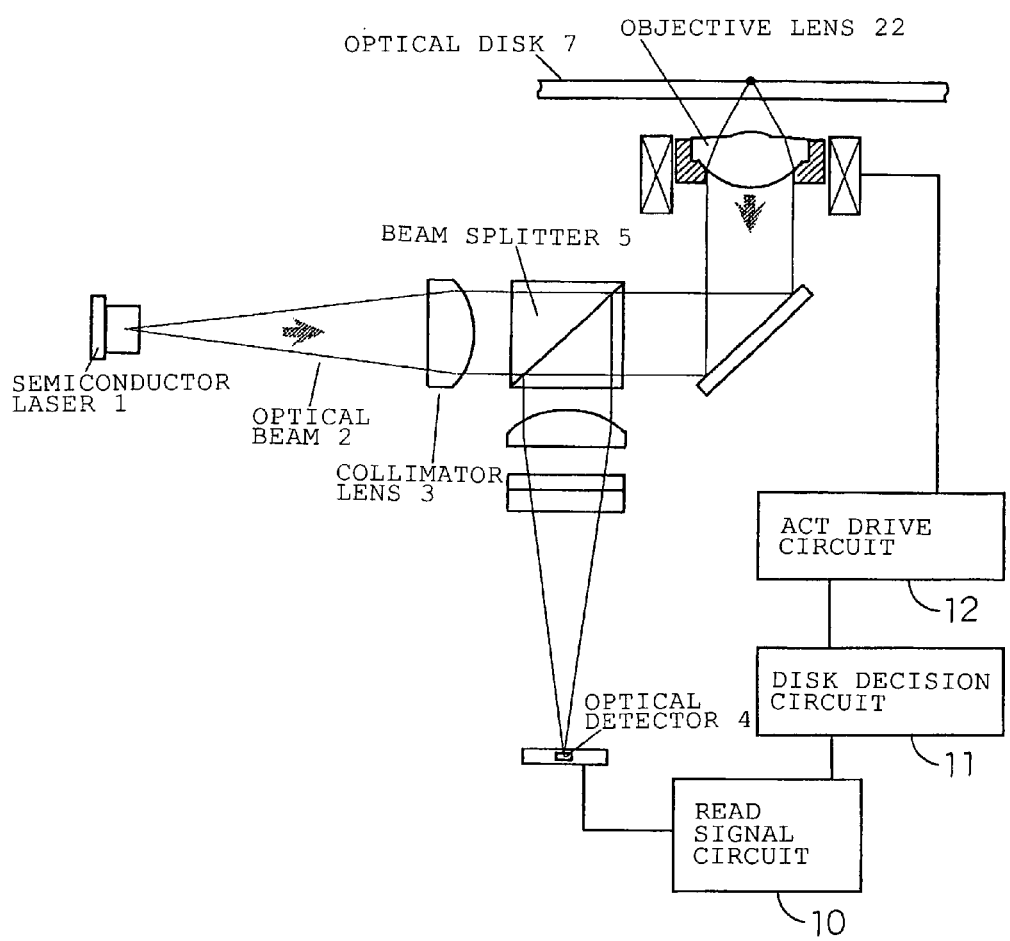
FIG. 13 illustrates a configuration of an optical system of an optical head according to Embodiment 3 of the present invention.

FIG. 13 illustrates a configuration of an optical system of an optical head according to Embodiment 3 of the present invention. The configuration shown in the same drawing is the same as the configuration of the optical head shown in Embodiment 1 of the present invention except the objective lens 22 and the same components as those in FIG. 11 are assigned the same reference numerals and explanations thereof will be omitted. FIG. 6 shows the objective lens 22 according to Embodiment 3.

Here, what the objective lens 22 according to Embodiment 3 differs from the objective lens 21 shown in Embodiment 2 is that the phase of the central area A1 is shifted from the peripheral area A3 by 1 wavelength (DVD wavelength) with respect to the wavelength of the DVD and that the thickness of the corresponding base material of the intermediate area A2 is set to 1.2 mm and that outside NA of the intermediate area A2 is set to 0.46.

As is apparent from a comparison between FIG. 4 and FIG. 6, "being shifted" means that the section indicated with broken line S is projected or lifted toward the substrate.

In Embodiment 2, the corresponding base material thickness of the intermediate area A2 is optimized to a thick desk, that is, a base material thickness of 1.8 mm in this case, while in this embodiment, the corresponding base material thickness of the intermediate area A2 is optimized to a base material thickness of 1.2 mm which is the base material thickness of the CD itself.

Figure 7:
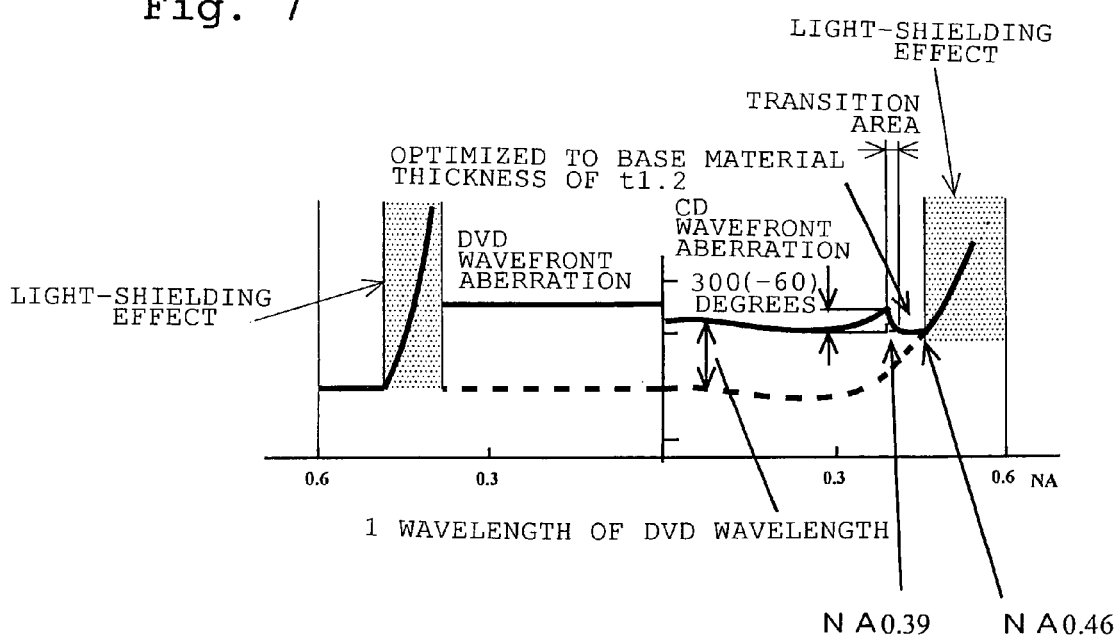
FIG. 7 illustrates a wavefront on the disk during reading of the DVD or CD according to Embodiment 3.

FIG. 7 illustrates wavefront aberration when a DVD7*a* with a base material thickness of 0.6 mm and CD7*b* with a base material thickness of 1.2 mm are read using the objective lens 22 according to Embodiment 3.

Since the intermediate area A2 is optimized to a base material thickness of 1.2 mm, no aberration is produced when a CD7b with a base material thickness of 1.2 mm is read. Furthermore, in this Embodiment 3, there is almost no level difference on the boundary between the intermediate area A2 and peripheral area A3, and moreover the level difference between the central area A1 and intermediate area A2 can be made smaller than Embodiment 2 above.

A general method of molding an objective lens is to perform injection molding on a plastic material or apply thermo-pressing to a plastic material or glass material. Since processing is performed using metal molds in all cases, the ease of processing of metal molds and the life of metal molds are important factors that affect the cost of the lens itself.

From the standpoint of processing of metal molds, level differences on a lens need to be processed using sharp cutting tools, and are therefore not desirable. Therefore, it is desirable that either the inside perimeter or the outside perimeter of the intermediate area A2 be contiguous on the boundary to the central area A1 or peripheral area A3 without level differences.

Since a simulation conducted by the inventor has demonstrated that it is possible to reduce CD jitter by changing the intermediate area A2 from 240 degrees to 300 degrees (from −120 degrees to −60 degrees) when the corresponding base material thickness is 1.2 mm, it has been proven that it is possible to eliminate a level difference between the intermediate area A2 and peripheral area A3 by shifting the wavefront of the central area A1 by 1 phase with the wavelength (650 nm) of a DVD and further set the phase difference on the boundary between the intermediate area A2 and central area A1 to close to ideal 300 degrees (−60 degrees) resulting from a jitter reduction during a CD read by setting NA outside the intermediate area A2 to 0.46 and thereby reduce level differences in lens molding.

This makes it possible to further reduce the transition area of the boundary between the central area A1 and intermediate area A2.

Using this Embodiment 3 makes it possible to apply a press working method for glass materials and construct a high precision, high reliability system required for a DVD system in particular.

Embodiment 4

Figure 14:
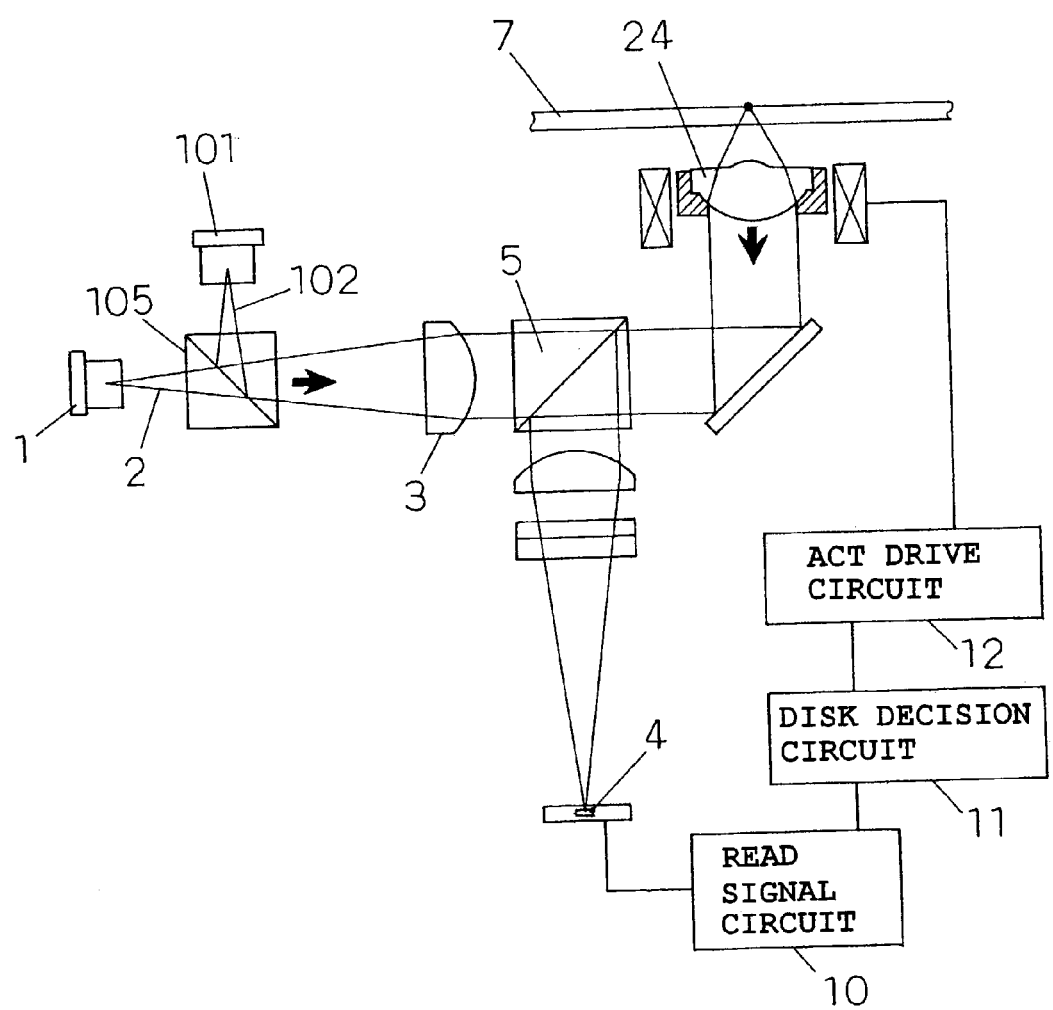
FIG. 14 illustrates an optical configuration according to Embodiment 4 of the present invention.

FIG. 14 illustrates a configuration of an optical system of an optical head according to Embodiment 4 of the present invention. Of the configuration shown in the same figure, the same components as those in FIG. 8 are assigned the same reference numerals and explanations thereof will be omitted. The optical detector 4 in FIG. 11 is applicable as the photoreception element of the optical head of the present invention and the read signal circuit 10 in FIG. 11 is applicable as the circuit of the optical information writing/reading apparatus of the present invention. The optical detector 4 is the means of receiving reflected light from the optical disk 7 and converting to an electrical signal and the read signal circuit 10 is the circuit for distinguishing the type of the optical disk 7 and selectively reading information from the electric signal.

The optical configuration of this embodiment of the present invention is significantly different from the conventional example in that the optical configuration of this embodiment of the present invention uses different semiconductor lasers for reading the DVD7a and for reading the CD7b. That is, when the DVD7a is read, the optical beam 2 from the semiconductor laser 1 having a wavelength of 650 nm is converged to the DVD7a through the objective lens 24 and the reflected light is reflected by the beam splitter 5 and received by the optical detector 4 as in the conventional examples. On the other hand, when the CD7b is read, the optical beam 102 from the semiconductor laser 101 having a wavelength of 780 nm is reflected by the beam splitter 105 and converged to the CD7b as in the case of the optical beam 2 which reads the DVD7a and the reflected light is reflected by the beam splitter 5 and received by the optical detector 4.

Here, what the objective lens 24 according to Embodiment 4 shown in FIG. 15 differs from the objective lens 23 shown in the conventional example is the intermediate area A2. The intermediate area A2 in the conventional example is optimized to a thick disk, that is, CD with a base material thickness of 1.2 mm, while in the present invention the intermediate area A2 has a non-spherical shape provided with a diffraction grating and the wavefront that has passed through the grating is set so as to be optimized to the base material thickness of 0.6 mm of the DVD7a when the DVD7a is read, that is, when the optical beam 2 from the semiconductor laser 1 passes, and it is set so as to be optimized to the base material thickness of 1.2 mm of the CD7b due to the wavelength dependency of the diffraction grating when the CD7b is read, that is, when the optical beam 102 from the semiconductor laser 101 passes.

NA of the intermediate area is set to NA 0.39 to NA 0.45 as in the cases of Embodiments 1 to 3 of the present invention.

Figure 16:
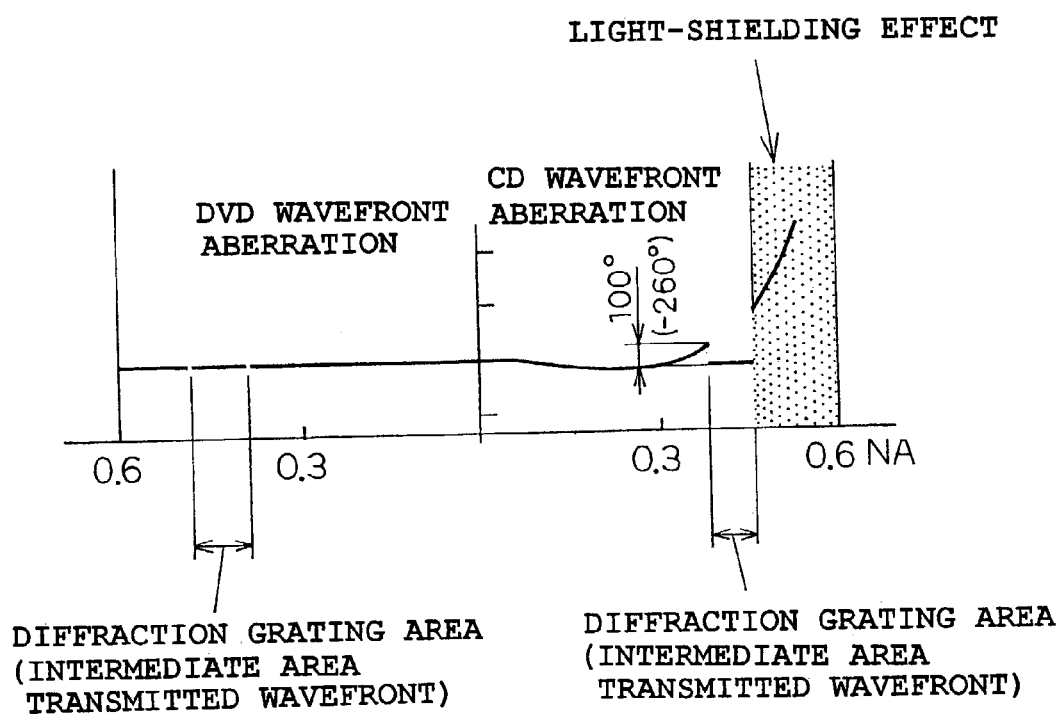
FIG. 16 illustrates a wavefront on the disk during reading of the DVD or CD according to the above embodiment.

FIG. 16 illustrates wavefront aberration when the DVD7a of the base material thickness of 0.6 mm and that of the base material thickness of 1.2 mm are read using the objective lens 24. When the DVD7a is read, the central area A1 and peripheral area A3 are optimized to the base material thickness of the DVD7a and the intermediate area A2 is optimized to the base material thickness 0.6 mm of the DVD7a at the DVD7a laser wavelength of 650 nm via the diffraction grating as described above and therefore it is possible to obtain wavefront with no aberration over the entire area during a read of the DVD7a. Furthermore, all luminous fluxes are converged to the DVD7a over the entire area, it is possible to increase the light utilization efficiency when a DVD is read compared to the lens 23 in the conventional example.

On the other hand, when the CD7b is read, certain spherical aberration occurs in the central area A1, but since the intermediate area A2 is optimized to the base material thickness of 1.2 mm of the CD7b at CD7b laser 780 nm via the diffraction grating as in the case of a read of the DVD7a, it is possible to suppress aberration of the entire area used to read the CD7b to a low level. Furthermore, since level differences on the boundary between the central area A1 and intermediate area A2 are set to approximately 4 microns, level differences occur which correspond to 4 wavelengths at DVD read wavelength 650 nm, but during a read of the DVD7a, waterfront is set so as to be contiguous without phase difference.

This level difference setting on the boundary generates a phase level difference of approximately −100 degrees (260 degrees) on the boundary between the central area A1 and intermediate area A2 due to a wavelength difference during a CD read. As in the case of the third embodiment of the present invention, this phase difference setting has an effect of reducing read signal jitter during a read of the CD7b. By the way, luminous flux that has passed through the peripheral area A3 during a read of the CD7b involves large spherical aberration and does not contribute to the read signal.

Embodiment 5

Figure 17:
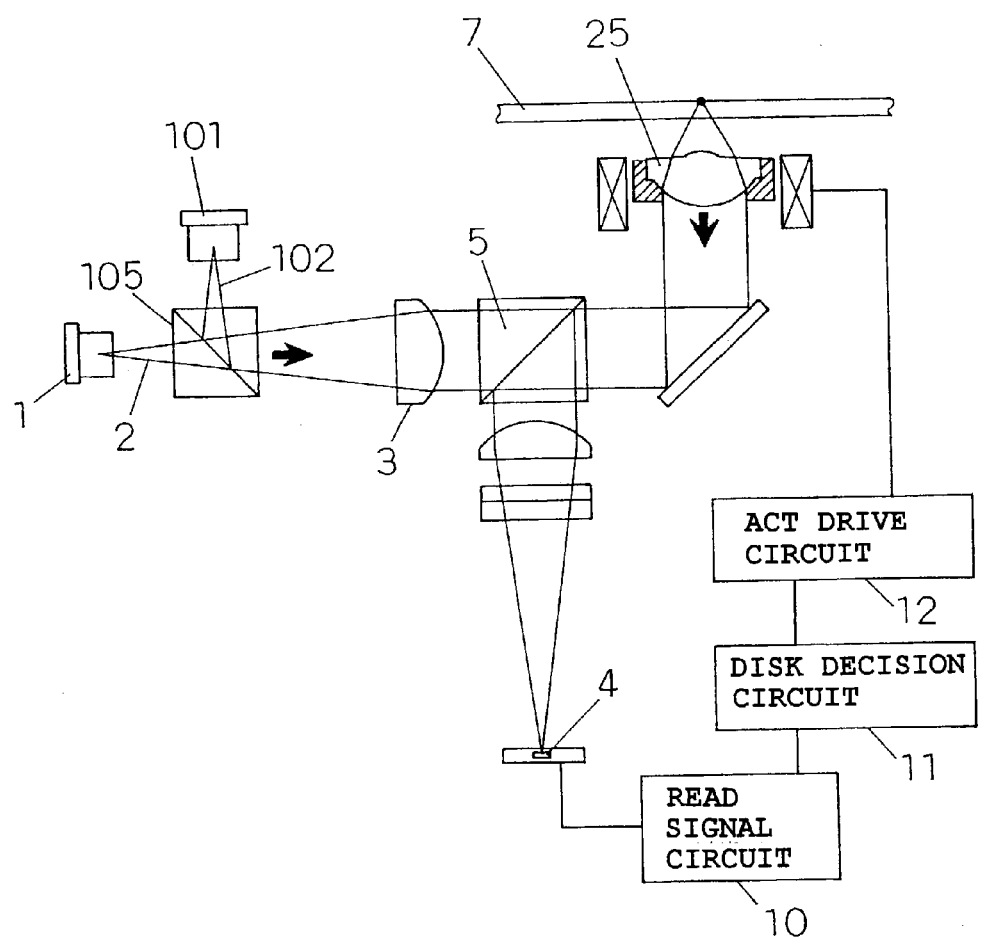
FIG. 17 illustrates an optical configuration according to Embodiment 5 of the present invention.
Figure 18B:
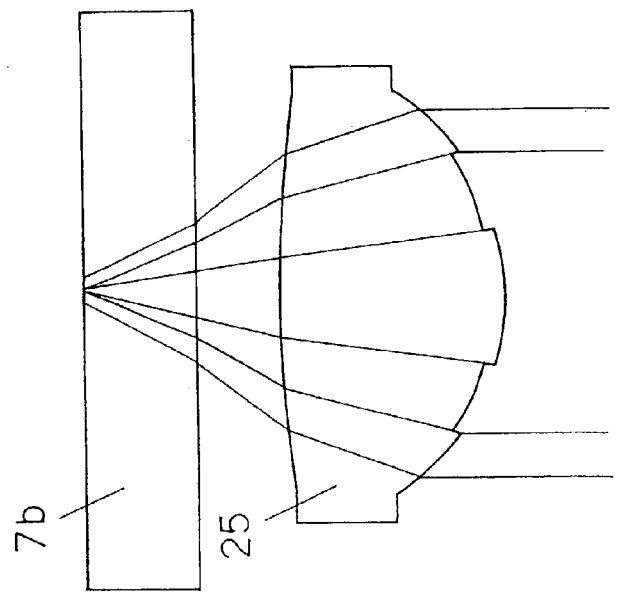
FIGS. 18 (a) and (b) illustrate an objective lens of the embodiment above.
Figure 18A:
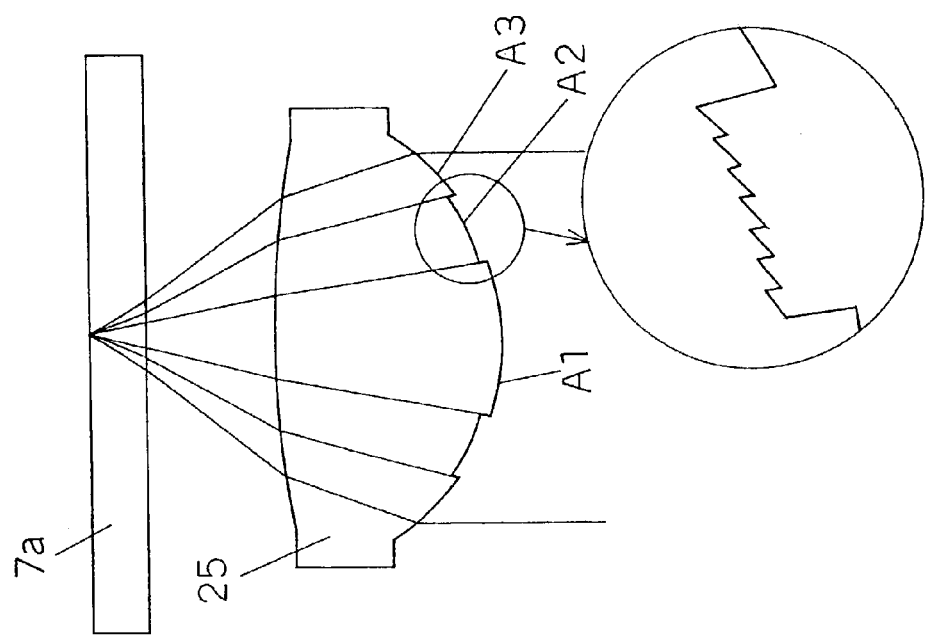

FIG. 17 illustrates a configuration of an optical system of an optical head according to Embodiment 5 of the present invention. The configuration shown in the same figure is the same as the configuration of the optical head shown in Embodiment 4 of the present invention except the objective lens 25 and the same components as those in FIG. 14 are assigned the same reference numerals and explanations thereof will be omitted. FIG. 18 illustrates the objective lens 25 of Embodiment 5.

What the objective lens 25 of Embodiment 5 differs from the objective lens 24 shown in Embodiment 4 is NA in the inside perimeter of the intermediate area A2. NA in the inside perimeter of the intermediate area A2 of the objective lens 25 is set to 0.2. The conventional example has a configuration in which luminous flux of the intermediate area A2 does not contribute to a DVD read and has therefore a low degree of freedom in the setting of NA of the intermediate area A2 from the standpoint of the quality of a DVD7a read signal, while the present invention has a configuration in which luminous flux that has passed through the intermediate area A2 also contributes to a DVD read and can therefore freely set NA of the intermediate area A2.

Figure 19:
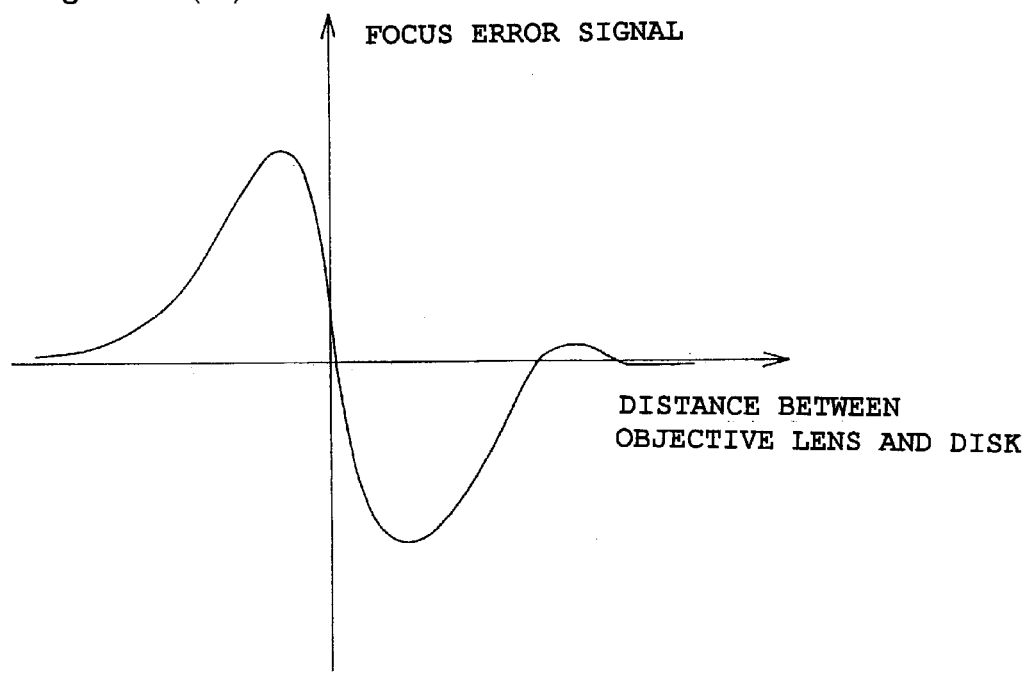
FIGS. 19 (a) and (b) illustrate a focus error signal of the conventional example and the embodiment above.
Figure 19:
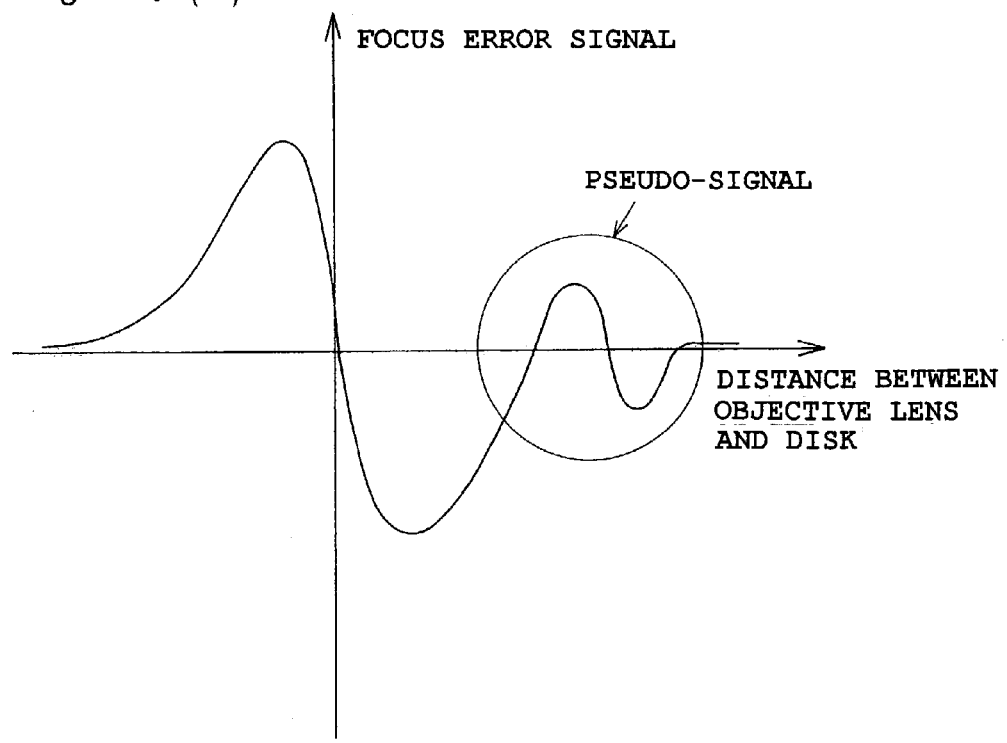

Setting NA in the inside perimeter of the intermediate area to a small value makes it possible to reduce spherical aberration of the central area A1 during a read of the CD7b. This reduction of spherical aberration of the central area A1 has an effect of improving a focus error signal during a read of the CD7b. FIG. 19 (a) shows a focus error signal in this embodiment of the present invention. For a comparison, the focus error signal in the conventional example is also shown in FIG. 19 (b), but since spherical aberration of the central area A1 is reduced, folding of the focus error signal is reduced. This prevents misoperation during focusing.

Embodiment 6

Figure 20:
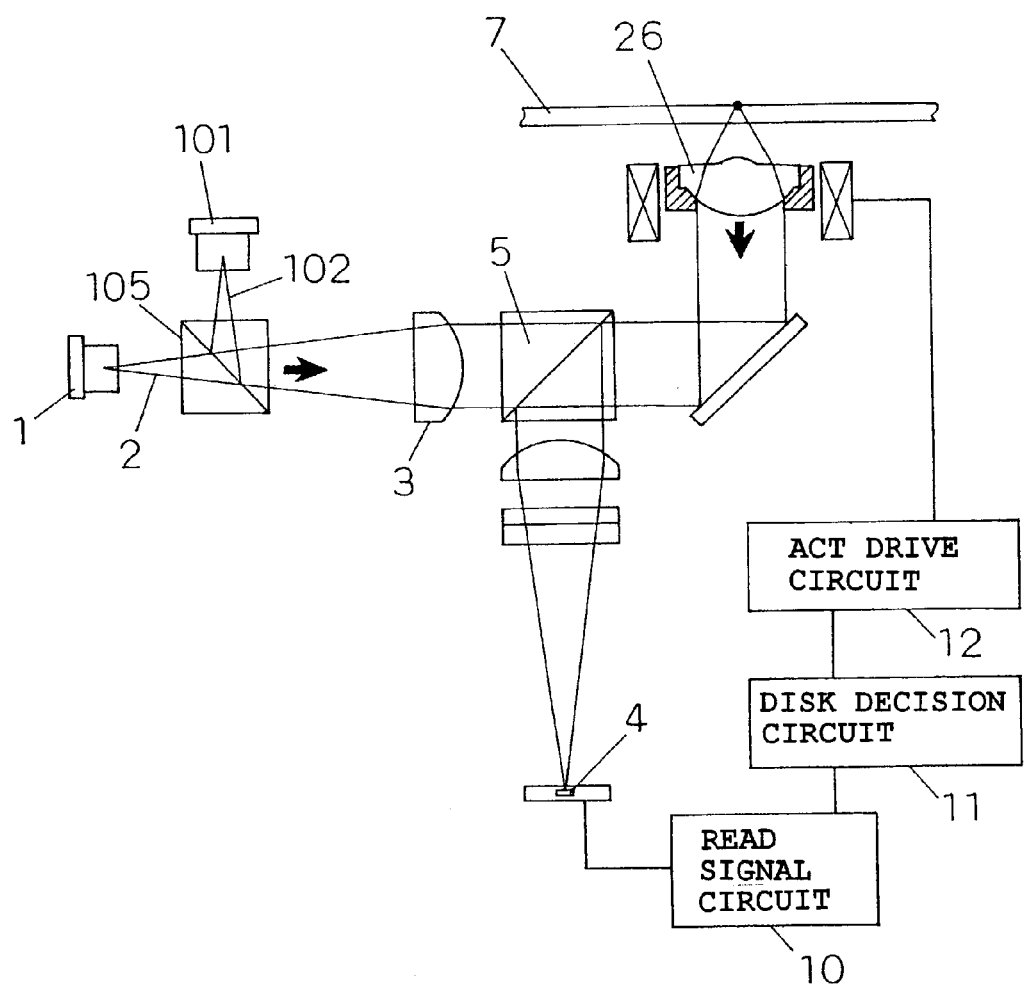
FIG. 20 illustrates an optical configuration according to Embodiment 6 of the present invention.

FIG. 20 illustrates a configuration of an optical system of an optical head according to Embodiment 6 of the present invention. The configuration shown in the same drawing is the same as the configuration of the optical head shown in Embodiment 4 of the present invention except the objective lens 26 and the same components as those in FIG. 14 are assigned the same reference numerals and explanations thereof will be omitted. FIG. 21 illustrates the objective lens 26 of Embodiment 6.

What the objective lens 26 of Embodiment 6 differs from the objective lens 24 shown in Embodiment 4 is that a diffraction grating is provided also in the peripheral intermediate area A3. However, during a read of the DVD7a, the diffraction grating of the peripheral area A3 of the objective lens 26 is set so as to form optimal wavefront for the DVD7a when the optical beam 2 with a laser wavelength of 650 nm transmits during a read of the DVD, while it is set so as to produce considerable spherical aberration for the CD7b when the optical beam 102 with a laser wavelength of 780 nm transmits during a CD read.

Figure 22:
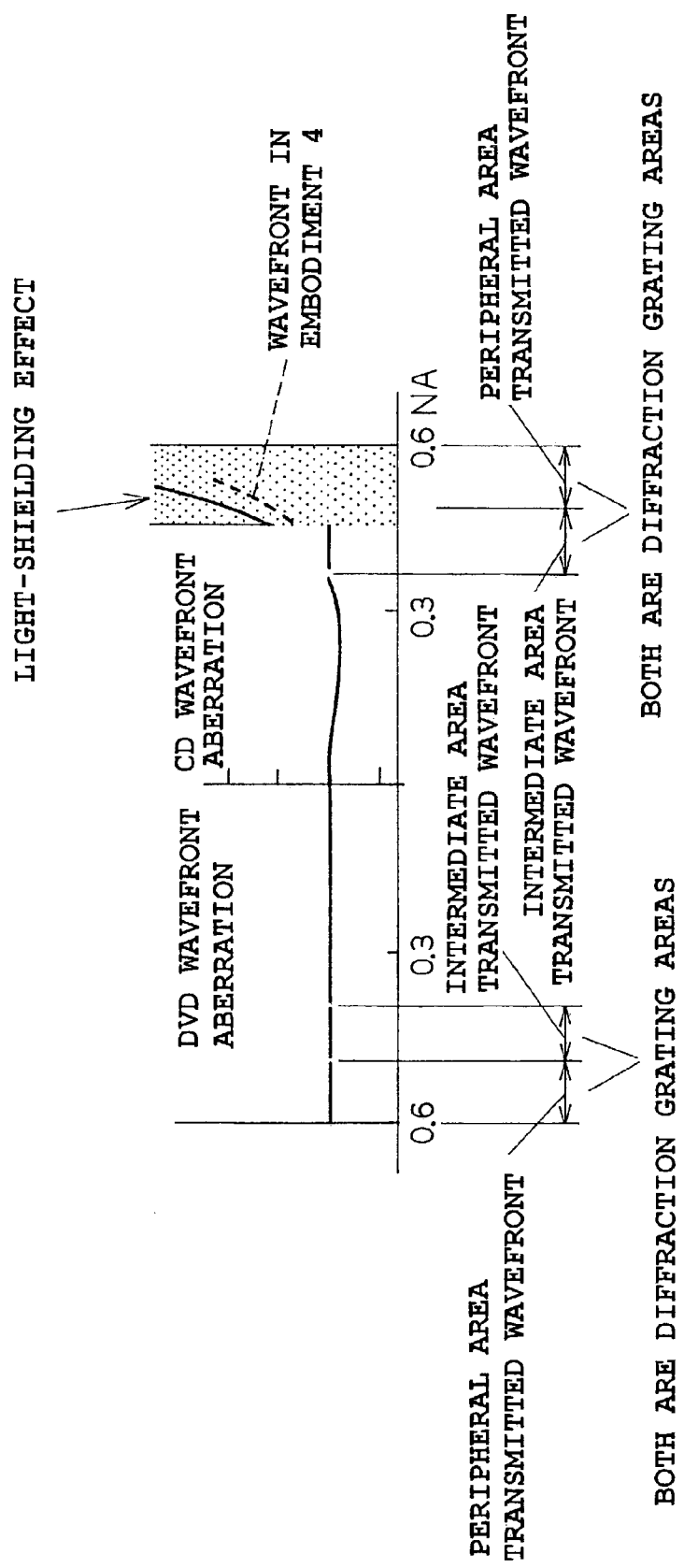
FIG. 22 illustrates a wavefront on the disk during reading of the DVD or CD according to the above embodiment.

FIG. 22 shows wavefront aberration when the DVD7a with a base material thickness of 0.6 mm and that with a base material thickness of 1.2 mm are read using the objective lens 26. During a read of the DVD7a, the central area A1 is optimized to the base material thickness of DVD7a and the intermediate area A2 and peripheral area A3 are optimized to the base material thickness 0.6 mm of the DVD7a at a DVD7a laser wavelength of 650 nm via the diffraction grating as described above, and therefore it is possible to obtain wavefront with no aberration over the entire area during a read of the DVD7a.

Furthermore, since all luminous fluxes are converged to the DVD7a over the entire area, it is possible to increase the light utilization efficiency during a DVD read compared to the lens 23 in the conventional example. On the other hand, when the CD7b is read, certain spherical aberration occurs in the central area A1, but since the intermediate area A2 is optimized to the base material thickness of 1.2 mm of the CD7b at CD7b laser 780 nm via the diffraction grating as in the case of a read of the DVD7a, it is possible to suppress aberration of the entire area used to read CD7b to a low level. By the way, the luminous flux that has passed through the peripheral area A3 during a read of the CD7b involves even greater spherical aberration than the lens in Embodiment 4 or Embodiment 5 of the present invention due to the diffraction grating, which further reduces its contribution to the read signal.

The present invention obtains an outstanding effect of reducing deterioration of CD read jitter due to a phase shift of the intermediate area by setting the corresponding base material thickness of the intermediate area to a thick disk, that is, 1.6 mm thicker than the CD base material thickness of 1.2 mm, thereby setting the amount of phase to an appropriate amount, optimizing the central area and intermediate area combined to the CD.

The present invention obtains an outstanding effect of reducing deterioration of CD read jitter due to a phase shift of the intermediate area by setting the corresponding base material thickness of the intermediate area to a thick disk, that is, 1.8 mm thicker than the CD base material thickness of 1.2 mm, eliminating level differences of the intermediate area and peripheral area, optimizing the central area and intermediate area combined to the CD, and also an outstanding effect of facilitating the manufacturing of lens processing metal molds. Especially, the present invention allows manufacturing using a glass material, making it possible to provide high precision and high reliability required for a DVD system, etc.

The present invention shifts the wavefront of the central area by 1 wavelength (DVD wavelength) from the peripheral area, and can thereby set the amount of phase difference between the central area and intermediate area to an appropriate amount and reduce level differences among areas to a very small level, further facilitating manufacturing of DVD/CD compatible lenses that can be subjected to glass pressing.

INDUSTRIAL APPLICABILITY

As apparent from the foregoing explanations, the present invention can reduce deterioration of read jitter of an optical disk with a large base material thickness due to differences such as manufacturing errors in the amount of phase shift of the intermediate area with respect to the central area of an objective lens.

The present invention has advantages of being able to facilitate the processing of an objective lens processing metal mold, reduce lens costs by extending the life of the metal mold or select glass as a material of the lens and thereby implement a system with higher accuracy and higher reliability.

Furthermore, the present invention allows luminous flux passing through the intermediate area to be used during both a DVD read and CD read, thus making it possible to improve the transmission efficiency during a DVD read. Moreover, its ability to expand NA of the intermediate area reduces spherical aberration during a CD read, making it possible to improve focus error signals.

Moreover, the provision of a diffraction grating in the peripheral area, too can further reduce stray light of outside perimeter light during a CD read.

The invention claimed is:

1. A convex lens for allowing luminous flux from a first light source to converge to a first optical information recording medium having a predetermined thickness and allowing luminous flux from a second light source having a wavelength different from the first light source to converge to a second optical information recording medium which is thicker than the first optical information recording medium, characterized in that said lens comprises:

a central area close to the central axis of said luminous flux;

a peripheral area far from said central axis; and an intermediate area located midway between said central area and said peripheral area, and the luminous flux converging onto the information recording surface of said first optical information recording medium from said first light source is the luminous flux that has passed through said central area, said intermediate area and said peripheral area, the luminous flux converging onto the information recording surface of said second optical information recording medium from said second light source is the luminous flux that has passed through said intermediate area and said central area, said central area provides only a refraction effect; and said intermediate area is provided with a diffraction grating, characterized in that the diffraction grating of the intermediate area, using diffracted light of the same order, forms luminous flux from the first light source into a reduced wavefront aberration with respect to the first optical information recording medium and forms luminous flux from the second light source into a reduced wavefront aberration with respect to the second optical information recording medium.

2. The lens according to claim 1, characterized in that of the luminous flux converged onto the information recording surface of said second optical information recording medium from said second light source, the phase of the luminous flux that passes through said intermediate area is shifted with respect to the phase of the luminous flux that passes through said central area.

3. The lens according to claim 2, characterized in that the shift of said phase is set so as to delay by an amount Δ that satisfies the following (Equation 1):

$$240°+m\times360°<\Delta<360°+n\times360° \quad \text{Equation 1}$$

m: Integer, n: integer more than or equal to m.

4. The lens according to claim 3, characterized in that said amount Δ is an amount that satisfies the following (Equation 2):

$$270°+m\times360°<\Delta<330°+n\times360° \quad \text{Equation 2}$$

m: Integer, n: integer more than or equal to m.

5. The lens according to any one of claims 1 or 2–4, characterized in that wherein a diffraction grating is provided in the peripheral area far from said central axis.

6. An optical head, characterized by comprising:

a lens according to any one of claims 1 or 2–4; and a photoreception element that receives reflected light from said first optical information recording medium or said second optical information recording medium and converts said reflected light to an electric signal.

7. An optical information recording medium writing/reading apparatus, characterized by comprising said optical head according to claim 6 and a circuit that distinguishes said first optical information recording medium from said second optical information recording medium and selectively reads information from said electric signal, wherein the apparatus, converges luminous flux from a light source onto said first optical information recording medium or said second optical information recording medium, receives reflected light from said first optical information recording medium or said second optical information recording medium, converts said reflected light to an electric signal and reads information from said electric signal, converges the luminous flux that has passed through said central area and said peripheral area of said lens onto the information recording surface of said first optical information recording medium, and converges the luminous flux that has passed through said intermediate area and said central area of said lens onto the information recording surface of said second optical information recording medium.

8. An optical information recording medium writing/reading method for, by using an optical head according to claim 7 and a circuit that distinguishes said first optical information recording medium from said second optical information recording medium and selectively reads information from said electric signal, converging luminous flux from a light source onto said first optical information recording medium or said second optical information recording medium, receiving reflected light from said first optical information recording medium or said second optical information recording medium, converting said reflected light to an electric signal and reading information from said electric signal, wherein the luminous flux that has passed through said central area and said peripheral area of said lens is allowed to converge onto the information recording surface of said first optical information recording medium, and the luminous flux that has passed through said intermediate area and said central area of said lens is allowed to converge onto the information recording surface of said second optical information recording medium.

9. A convex lens for allowing luminous flux from a first light source to converge to a first optical information recording medium having a predetermined thickness and allowing luminous flux from a second light source having a wavelength different from the first light source to converge to a second optical information recording medium which is thicker than the first optical information recording medium, characterized in that said lens comprises:

a central area close to the central axis of said luminous flux;

a peripheral area far from said central axis; and an intermediate area located midway between said central area and said peripheral area, and the luminous flux converging onto the information recording surface of said first optical information recording medium from said first light source is the luminous flux that has passed through said central area, said intermediate area and said peripheral area, the luminous flux converging onto the information recording surface of said second optical information recording medium from said second light source is the luminous flux that has passed through said intermediate area and said central area, and said intermediate area is provided with a diffraction grating, characterized in that the diffraction grating of the intermediate area, using diffracted light of the same order, forms luminous flux from the first light source into a reduced wavefront aberration with respect to the first optical information recording medium and forms luminous flux from the second light source into a reduced wavefront aberration with respect to the second optical information recording medium.

* * * * *

UNITED STATES PATENT AND TRADEMARK OFFICE
CERTIFICATE OF CORRECTION

PATENT NO. : 6,995,909 B1
APPLICATION NO. : 10/089998
DATED : February 7, 2006
INVENTOR(S) : Hayashi et al.

It is certified that error appears in the above-identified patent and that said Letters Patent is hereby corrected as shown below:

Title Page,

On Title Page Col. 2, Item (57), replace the abstract with the following Abstract:

--Conventional lenses for DVD/CD compatible writing/reading are liable to CD jitter deterioration due to phase shifts in a central area. Setting a corresponding base material thickness of an intermediate area to greater than 1.2 mm which is the base material thickness of the CD makes it possible to reduce jitter deterioration due to phase shifts and eliminate level differences between the central area and peripheral area, facilitate manufacturing of processing metal molds, allow extension of a life, which in turn makes it possible to use glass as a lens material, realize cost reduction or provide a system with higher precision and higher reliability.--

Signed and Sealed this

Eighth Day of August, 2006

JON W. DUDAS
*Director of the United States Patent and Trademark Office*